(12) United States Patent
Xing

(10) Patent No.: US 9,058,494 B2
(45) Date of Patent: Jun. 16, 2015

(54) METHOD, APPARATUS, SYSTEM, AND COMPUTER READABLE MEDIUM TO PROVIDE SECURE OPERATION

(71) Applicant: Intel Corporation, Santa Clara, CA (US)

(72) Inventor: Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 13/838,038

(22) Filed: Mar. 15, 2013

(65) Prior Publication Data

US 2014/0283093 A1  Sep. 18, 2014

(51) Int. Cl.
G06F 21/00 (2013.01)
G06F 21/60 (2013.01)
G06F 21/62 (2013.01)
G06F 21/72 (2013.01)
G06F 21/74 (2013.01)

(52) U.S. Cl.
CPC ............ *G06F 21/60* (2013.01); *G06F 21/6218* (2013.01); *G06F 21/72* (2013.01); *G06F 21/74* (2013.01)

(58) Field of Classification Search
None
See application file for complete search history.

(56) References Cited

U.S. PATENT DOCUMENTS

| | | | |
|---|---|---|---|
| 7,712,143 B2 | 5/2010 | Comlekoglu | |
| 7,958,497 B1* | 6/2011 | Lindo et al. | 717/128 |
| 8,140,655 B1* | 3/2012 | Schantz et al. | 709/223 |
| 8,286,001 B2 | 10/2012 | Ye et al. | |
| 2007/0198851 A1 | 8/2007 | Goto | |
| 2008/0077994 A1* | 3/2008 | Comlekoglu | 726/27 |
| 2008/0092235 A1 | 4/2008 | Comlekoglu | |
| 2008/0307488 A1 | 12/2008 | Hammond et al. | |
| 2009/0187769 A1 | 7/2009 | Camiel | |
| 2009/0292893 A1 | 11/2009 | Henry et al. | |
| 2011/0265180 A1 | 10/2011 | Unagami et al. | |
| 2012/0042380 A1 | 2/2012 | Kohiyama et al. | |
| 2012/0159184 A1 | 6/2012 | Johnson et al. | |
| 2012/0163589 A1 | 6/2012 | Johnson et al. | |
| 2012/0166795 A1 | 6/2012 | Wood et al. | |

(Continued)

FOREIGN PATENT DOCUMENTS

| | | |
|---|---|---|
| WO | 2011/078855 A1 | 6/2011 |
| WO | 2013/180736 A1 | 12/2013 |
| WO | 2014/143671 A1 | 9/2014 |

OTHER PUBLICATIONS

International Search Report and Written Opinion received for PCT Patent Application No. PCT/US2014/027684, mailed on Jul. 1, 2014, 9 pages.

(Continued)

*Primary Examiner* — Justin T Darrow
*Assistant Examiner* — Andrew Steinle
(74) *Attorney, Agent, or Firm* — Barre Law Firm, PLLC

(57) ABSTRACT

Technologies are provided in embodiments for receiving an enclave program for operation in an enclave, identifying at least one shared object dependency of the enclave program, determining whether the shared object dependency corresponds to at least one enclave shared object, causing association between the shared object dependency and the enclave shared object in circumstances where the shared object dependency corresponds to the enclave shared object, and causing association between the shared object dependency and an enclave-loadable non-enclave shared object in circumstances where the shared object dependency fails to correspond to the enclave shared object.

20 Claims, 13 Drawing Sheets

(56) References Cited

U.S. PATENT DOCUMENTS

| | | | |
|---|---|---|---|
| 2012/0233449 A1 | 9/2012 | Thibadeau et al. | |
| 2012/0235912 A1* | 9/2012 | Laubach | 345/163 |
| 2013/0182837 A1 | 7/2013 | Maliszewski et al. | |
| 2013/0232345 A1 | 9/2013 | Johnson et al. | |
| 2013/0339971 A1* | 12/2013 | Boland et al. | 718/104 |
| 2014/0047245 A1 | 2/2014 | Goffman et al. | |

OTHER PUBLICATIONS

Xing et al., "Methods and Apparatus for Protecting Software From Unauthorized Copying", U.S. Appl. No. 14/125,743, filed Dec. 12, 2013.

Xing et al., "Methods and Apparatus for Protecting Software From Unauthorized Copying", International Patent Application No. PCT/US2013/066715 filed on Oct. 24, 2013.

Intel, "Intel Technology Journal", vol. 10, Issue 3, Virtualization in the Enterprise, 2006, 13 pages.

Memory-Mapped I/O, "Memory-mapped I/O—The GNU C Library", retrieved on Aug. 13, 2013, 5 pages.

Design Overview, "JNI Interface Functions and Pointers", Chapter 2, retrieved on Aug. 13, 2013, 2013, 7 pages.

Oracle, "The Invocation API" Chapter 5, Java Native Interface Specification, retrieved on Aug. 13, 2013, 2011, 6 pages.

Wikipedia, "Remote Procedure Call", retrieved on Aug. 13, 2013, 5 pages.

International Search Report and Written Opinion received for PCT Patent Application No. PCT/US2013/066715, mailed on Jun. 26, 2014, 11 pages.

Non-Final Office Action received for U.S. Appl. No. 14/125,743, mailed on Feb. 12, 2015, 28 pages.

* cited by examiner

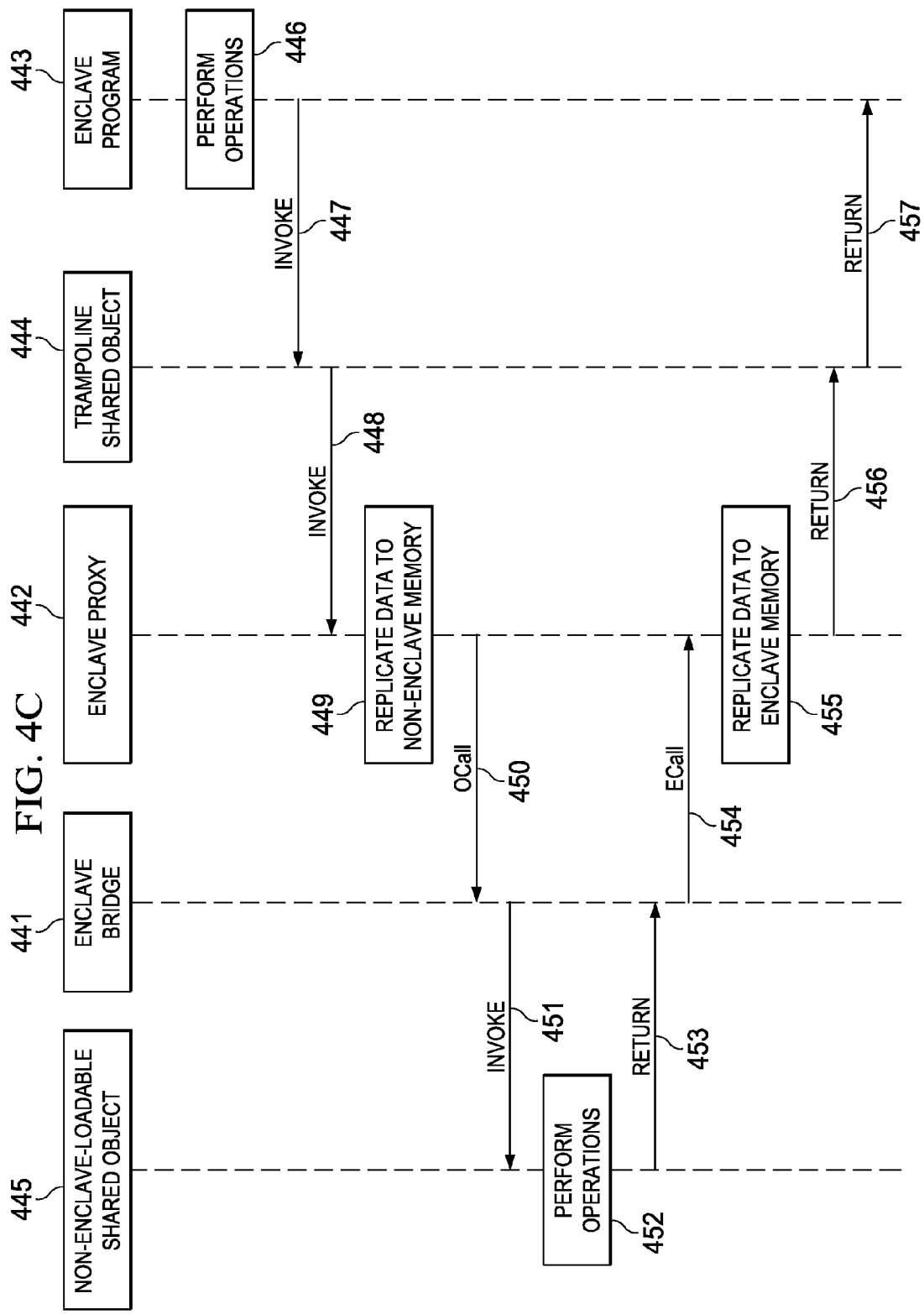

METHOD, APPARATUS, SYSTEM, AND COMPUTER READABLE MEDIUM TO PROVIDE SECURE OPERATION

TECHNICAL FIELD

This disclosure relates in general to the field of electronic apparatus security and, more particularly, to provide secure operation.

BACKGROUND

The field of apparatus security has become increasingly important in today's society. The Internet has enabled interconnection of different computer networks all over the world. However, the Internet has also presented many opportunities for malicious actors to exploit these networks to negatively impact an apparatus. Certain types of malicious software (e.g., bots) can be configured to receive commands from a remote operator once the software has infected a host computer. The software can be instructed to perform any number of malicious actions, such as sending out spam or malicious emails from the host computer, stealing sensitive information from a business or individual associated with the host computer, propagating to other host computers, and/or assisting with distributed denial of service attacks. In addition, the malicious actor can sell or otherwise give access to other malicious actors, thereby escalating the exploitation of the host computers. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4A-4E are interaction diagrams illustrating interaction associated with an enclave according to at least one embodiment;

DETAILED DESCRIPTION OF EMBODIMENTS

Figure 1A:
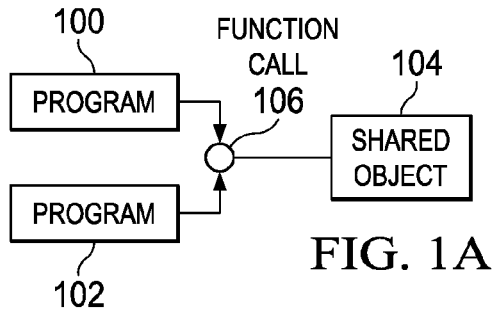
FIGS. 1A and 1B are block diagrams illustrating association between a program and a shared object according to at least one embodiment.
Figure 1B:
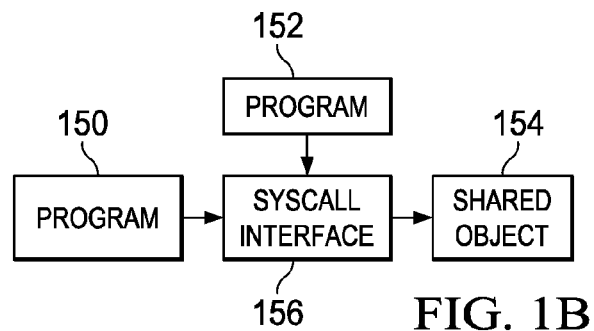

FIGS. 1A and 1B are block diagrams illustrating association between a program and a shared object according to at least one embodiment. The examples of FIGS. 1A and 1B are merely examples of association between a program and a shared object, and do not limit the scope of the claims. For example, operations attributed to a component may vary, number of components may vary, composition of a component may vary, and/or the like. For example, in some embodiments, operations attributable to one component of the example of FIG. 1A or 1B may be allocated to one or more other components.

In computing systems, it may be desirable for multiple programs to be able to utilize a common set of services. For example, it may be desirable for multiple programs to be able to provide information to a display, receive information from an input device, send information via a communication device, and/or the like.

In at least one embodiment, more than one program utilizes a shared object to access a common set of services. In at least one embodiment, a shared object relates to any functionality that is made available to more than one program. For example, a shared object may be a library, an application programming interface (API) provided by an operating system, a kernel, a driver, and/or the like. In at least one embodiment, a part of a program that utilizes a shared object is referred to as a shared object dependency. For example, a shared object dependency may be a part of a program associated with performing a function call, receiving information from a function call, receiving a callback from a shared object, providing information to a shared object, receiving information from a shared object, invoking an operation by way of a shared object, and/or the like.

In at least one embodiment, an association exists between a shared object dependency and the shared object. For example, the association may relate to a mapping of a shared object dependency related to a specific service to the shared object that provides that specific service. In at least one embodiment, the shared object dependency may be an abstraction of the shared object, such as a handle, a name, an identifier, and/or the like. In such an example, the abstraction may be supplemented with an association to allow the program to interact with the shared object. For example, the abstraction may be mapped to the shared object by way of providing an address associated with the shared object so that the program may access the shared object by way of the abstraction and the mapped address.

In at least one embodiment, a program may cause invocation of a shared object by invocation of the shared object dependency. For example, if the shared object dependency relates to a function call representation in the program, the program may invoke the shared object dependency by performing an operation associated with transferring control to the shared object by way of the shared object dependency, such as by performance of the function call.

FIG. 1A is a block diagram illustrating association between a program and a shared object according to at least one embodiment. In the example of FIG. 1A, programs 100 and 102 have a shared object dependency on shared object 104. In the example of FIG. 1A, the shared object dependency of program 100 and the shared object dependency of program 102 are associated with function call 106 of shared object 104. In at least one embodiment, invocation of the shared object dependency relates to performance of a function call associated with the shared object dependency. For example, program 102 may invoke its association with function call 106 by way of performance of a representative function call operation comprised by program 102. In at least one embodiment, invocation of the shared object relates to performance of the function call associated with the shared object. For example, shared object 104 may perform operations associated with implementation of function call 106 based, at least in part, on program 100 invoking function call 106.

FIG. 1B is a block diagram illustrating association between a program and a shared object according to at least one embodiment. In at least one embodiment, invocation of a shared object is performed by way of a system call (syscall) operation. In at least one embodiment, a syscal operation relates to a mechanism for utilizing an operating system kernel service. In at least one example embodiment, a syscall operation relates to invocation of a shared object may be by way of a software interrupt, such as "INT80". For example, a program may perform an operation that triggers a software interrupt. In at least one embodiment, a syscall operation relates to an instruction that invokes an interrupt associated with invocation of the shared object, such as a syscall/sysenter instruction. The syscall may relate to an ioctl function, a fcntl function, and/or the like. In such an example, a kernel may receive notification of the syscall and invoke the shared object to perform an operation. In such an example, the program may receive control after completion of the syscall. In at least one embodiment, the program may access data in a data structure that may be accessed by the shred object. In this manner, a program may send information to the shared object by writing to such a data structure prior to invocation of the syscall operation. Similarly, the shared object may send information to the program by writing to such a data structure prior to completion of the software interrupt.

In the example of FIG. 1B, programs 150 and 152 are associated with shared object 154 by way of syscall interface 156. In at least one embodiment, invocation of the shared object dependency relates to invocation of a syscall operation indicative of a syscall function associated with the shared object dependency. For example, a program may perform an operation that invokes the syscall operation. In at least one embodiment, a syscall function relates to a function that the program desires to invoke by way of the syscall. The syscall operation may be indicative of a syscall function by way of identifying the function, corresponding to the function, and/or the like. In at least one embodiment, invocation of the shared object relates to performance of a function call of the shared object. For example, an interrupt handler may receive a software interrupt indicative of a function. In such an example, the kernel may perform a function call of the shared object. In at least one embodiment, the function call corresponds to the syscall function.

Figure 2A:
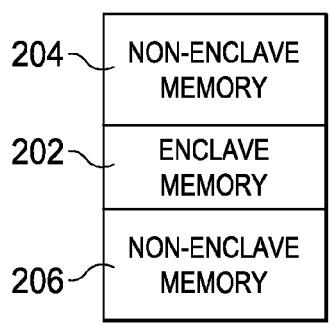
FIGS. 2A and 2B are block diagrams illustrating an enclave memory according to at least one embodiment.
Figure 2B:
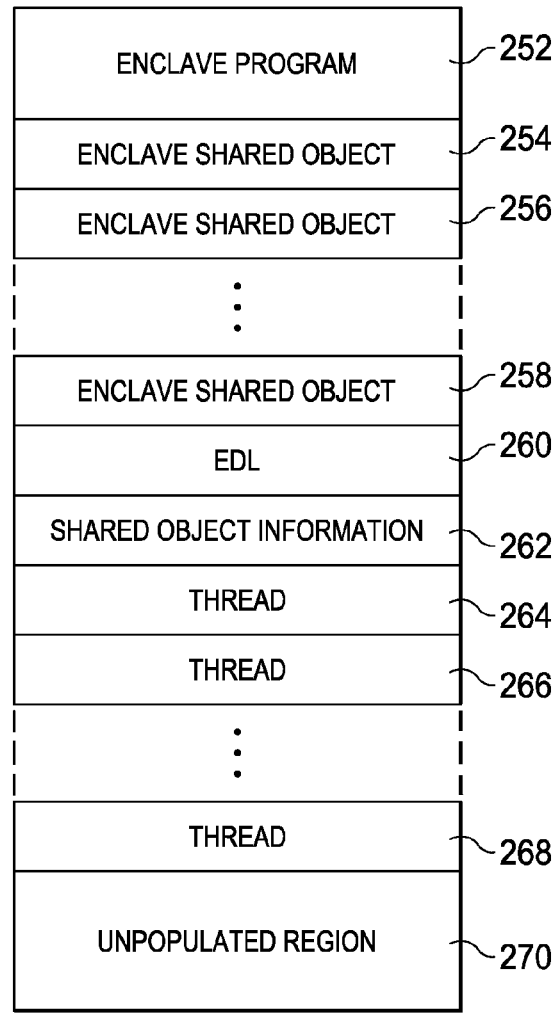

FIGS. 2A and 2B are block diagrams illustrating an enclave memory according to at least one embodiment. The examples of FIGS. 2A and 2B are merely examples of and enclave memory, and do not limit the scope of the claims. For example, operations attributed to a component may vary, number of components may vary, composition of a component may vary, and/or the like. For example, in some embodiments, operations attributable to one component of the example of FIGS. 2A and 2B may be allocated to one or more other components.

In some circumstances, a malicious program may perform actions that disrupt normal operation of a non-malicious program. For example, a malicious program may modify data that is used by a non-malicious program. In another example, a malicious program may modify memory where operations of a non-malicious program is stored, such that the malicious program changes operations that are performed by the non-malicious program. In this manner, the malicious program may utilize the non-malicious program for malicious purposes. It may be desirable to guard against such modification of memory that comprises data and/or instructions associated with a program.

In at least one embodiment, a processor provides for an enclave to guard against improper modification of instructions and/or memory associated with a program. In at least one embodiment, an enclave is a security measure provided by a processor, such as processor 1102 of FIG. 10. In at least one embodiment an enclave relates to a range of memory associated with a program. In at least one embodiment, the range of memory associated with an enclave program is referred to as enclave memory. In at least one embodiment, memory transactions associated with enclave memory are encrypted by the processor. In at least one embodiment, the processor encrypts the memory transactions by way of an enclave key. The enclave key may vary between different enclaves. For example, an enclave may have an associated enclave key and a different enclave may have a different associated enclave key. In at least one embodiment, the processor may preclude utilization of the enclave key associated with an enclave unless the processor is performing an instruction from the enclave memory. For example, if the processor is performing an operation from a memory outside of an enclave, the processor may preclude utilization of the enclave key. In this manner, if program outside of the enclave retrieves information from enclave memory, the processor may not decrypt the information.

In at least one embodiment, an enclave relates to a secure enclave.

Secure Enclave (SE) is a revolutionary feature of the next generation of processors. from Intel Corporation. In short, a secure enclave relates to an aperture into the virtual address space of an application. All memory transactions towards a given enclave range may be encrypted by the processor using a secure enclave specific key, and may be possible after the enclave is entered by an EENTER operation. For security reasons, any code outside of the enclave range may not be allowed to execute, and thus may never have a chance to access secure enclave memory.

In at least one embodiment, a processor operates in an enclave mode. In at least one embodiment, an enclave mode relates to the processor being in a state where the processor applies the enclave key to information. In at least one embodiment, the processor precludes execution of instructions from memory outside of an enclave while operating in enclave mode. For example, a processor may enter an enclave mode based on invocation of an EENTER operation. In such an example, the processor may preclude execution of any instructions from memory outside of the enclave memory until the processor exits the enclave mode. In at least one embodiment, a program that operates in an enclave mode is referred to as an enclave program.

FIG. 2A is a block diagram illustrating an enclave memory 202 in relation to non-enclave memory 204 and 206 according to at least one embodiment. As previously described, an enclave may preclude a non-enclave program from effecting and/or inspecting an enclave program by way of reading from and/or writing to enclave memory, such as enclave memory 202.

FIG. 2B is a block diagram illustrating partitioning of an enclave memory according to at least one embodiment. In the example of FIG. 2B, enclave memory comprises an enclave program 252, enclave shared objects 254, 256, and 258, an enclave dynamic linker (EDL) 260, shared object information 262, thread information 264, 266, and 268, and an unpopulated region 270. In at least one embodiment, an enclave may be created to comprise a statically allocated memory region. For example, the enclave may be created to have a specified enclave memory, and modification of the memory region allocated to the enclave memory may be precluded. In at least one embodiment, unpopulated region 270 relates to a region of enclave memory unassociated with data and/or instructions of any module of an enclave program. In at least one embodiment, thread information relates to information utilized for operating and managing one or more threads. It may be desirable to provide thread information in the enclave memory to allow for secure management of threads. Shared object information, EDL, and enclave shared objects may be similar as described regarding FIGS. 3A-3C. In at least one embodiment, an enclave program relates to the instructions that a processor executes to perform the operations of an enclave program.

Figure 3A:
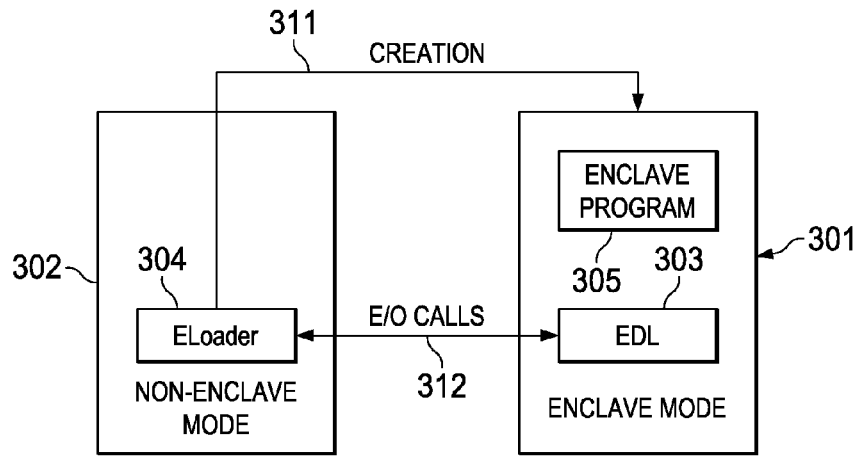
FIGS. 3A-3C are block diagrams illustrating an enclave according to at least one embodiment.
Figure 3B:
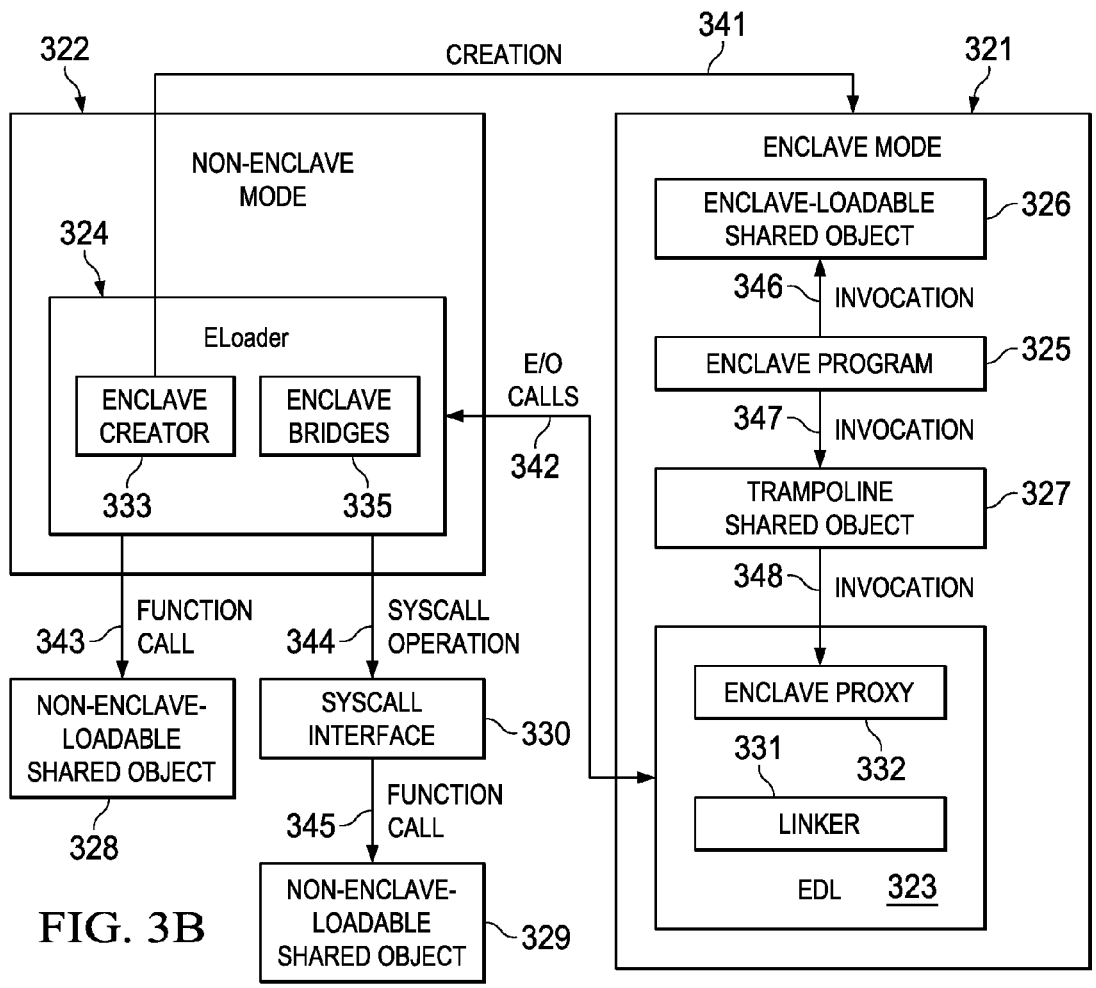
Figure 3C:
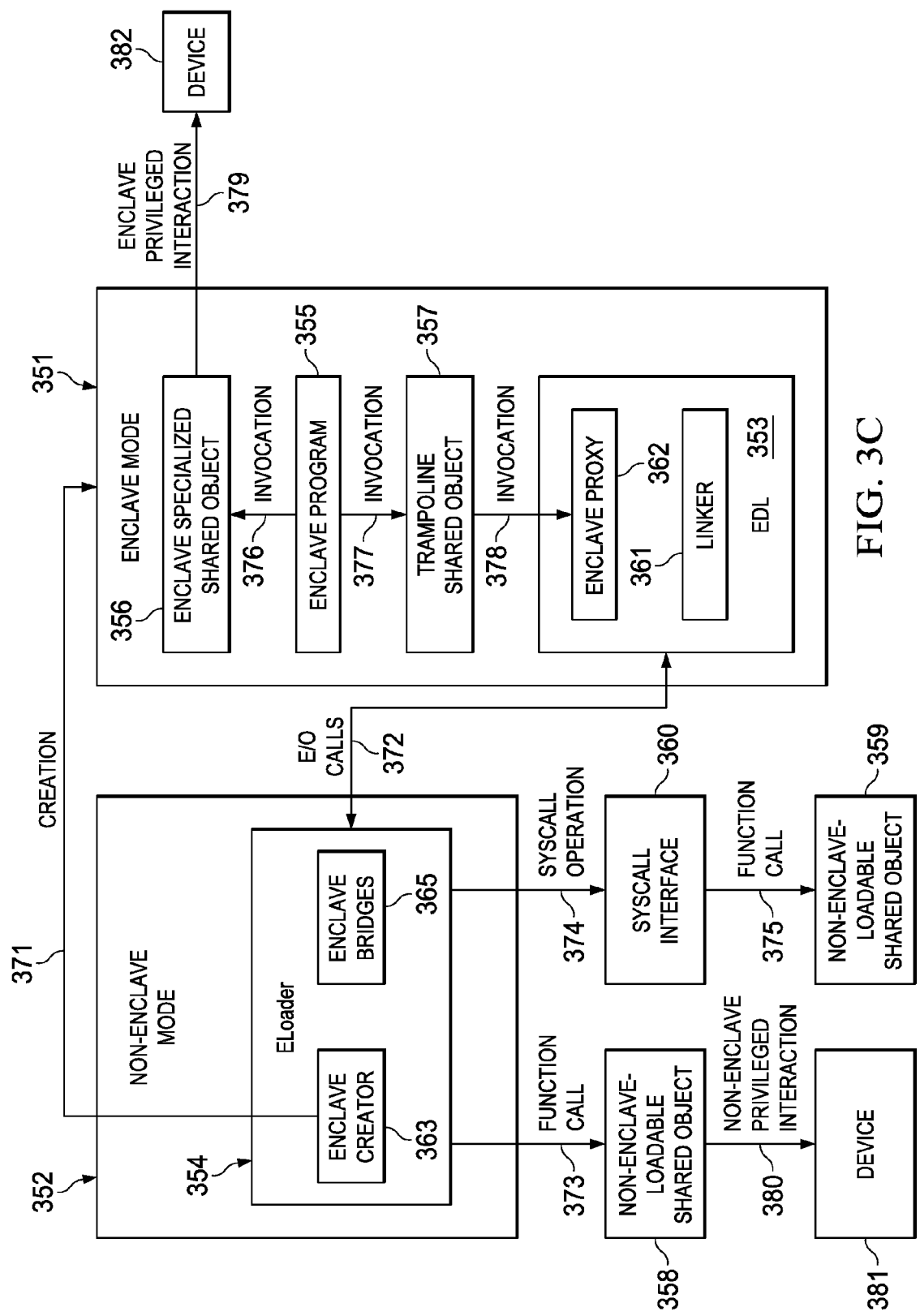

FIGS. 3A-3C are block diagrams illustrating an enclave according to at least one embodiment. The examples of FIGS. 3A-3C are merely examples of and enclave, and do not limit the scope of the claims. For example, operations attributed to a component may vary, number of components may vary, composition of a component may vary, and/or the like. For example, in some embodiments, operations attributable to one component of the example of FIGS. 2A and 2B may be allocated to one or more other components.

FIG. 3A is a block diagram illustrating an enclave according to at least one embodiment. In the example of FIG. 3A, enclave dynamic linker (EDL) 303 and enclave program 305 operate in enclave mode 301, and enclave loader (ELoader) 304 operates in a non-enclave mode 302.

In at least one embodiment, an ELoader performs operations associated with an enclave that may be performed outside of the enclave mode. For example, the ELoader may create the enclave, prepare the enclave program for loading, load the enclave program, respond to outward invocations from the enclave, send inward invocations to the enclave, and/or the like. In at least one embodiment, an outward invocation from an enclave relates to transfer of control from an enclave module to a non-enclave module. For example, there may be an OCall operation that may be performed in the enclave to exit enclave mode and invoke an operation outside of the enclave mode. In at least one embodiment, an inward invocation to the enclave relates to transfer of control from a non-enclave module to an enclave module. For example, there may be an ECall operation that may be performed outside of the enclave to enter the enclave mode and/or cause performance of an enclave operation. In at least one embodiment, the ELoader creates the enclave, for example, by way of invoking an ECreate operation. In the example of FIG. 3A, ELoader 304 creates enclave mode 301 by way of creation interaction 311.

In at least one embodiment, an EDL performs operations associated with enclave management within the enclave. For example, the EDL may perform dynamic linking within the enclave, prepare the enclave for operation after loading, send outward invocations from the enclave, respond to inward invocations to the enclave, and/or the like.

In this manner, an ELoader and EDL may interact with each other, for example by way of ECalls and OCalls. In the example of FIG. 3A, ELoader 304 and EDL 303 interact with each other by way of E/O calls interaction 312.

FIG. 3B is a block diagram illustrating an enclave according to at least one embodiment. In the example of FIG. 3B, enclave dynamic linker (EDL) 323, enclave program 325, enclave shared object 326 and trampoline shared object 327 operate in enclave mode 321, and enclave loader (ELoader) 324 operates in a non-enclave mode 322. In the example of FIG. 3B, ELoader 324 and EDL 323 interact with each other by way of E/O calls interaction342. In the example of FIG. 3B, ELoader 324 creates enclave mode 321 by way of creation interaction 341.

In at least one embodiment, an ELoader may comprise software modules for performing one or more operations. For example, the ELoader may comprise an enclave creator. In at least one embodiment, an enclave creator performs operations associated with creation of the enclave, such as creation, adding memory pages, initialization, and/or the like. In another example, the ELoader may comprise an enclave bridge. In at least one embodiment, an enclave bridge interacts with a module within an enclave, such as by way of receiving OCalls, invoking ECalls, and/or the like. In the example of FIG. 3B, ELoader 324 comprises enclave creator 333 and enclave bridges 335.

In at least one embodiment, an EDL may comprise software modules for performing one or more operations. For example, the EDL may comprise a linker. In at least one embodiment, a linker performs operations such as associating dependencies with function calls. For example, the linker may evaluate a loaded enclave program to resolve the program's dependencies so that the dependencies map to one or more function calls. In another example, the EDL may comprise an enclave proxy. In at least one embodiment, an enclave proxy interacts with a module outside of an enclave, such as by way of receiving ECalls, invoking OCalls, and/or the like. In the example of FIG. 3B, EDL 323 comprises enclave proxy 332 and linker 331.

In some circumstances, it may be desirable for an enclave program to utilize a shared object. In such circumstances, the enclave may preclude direct usage of the shared object. For example, the shared object may be associated with non-enclave memory. In such circumstances, the enclave program may not directly invoke the shared object from within the enclave.

In some circumstances, a shared object may be an enclave-loadable shared object. In such circumstances, it may be desirable for the enclave-loadable shared object to be loaded to the enclave to allow an enclave program to utilize the enclave-loadable shared object within the enclave. In at least one embodiment, an enclave-loadable shared object relates to a shared object that is capable of operation with an enclave. An enclave-loadable shared object may not necessarily have been designed for operation within an enclave, but may, nonetheless, be suitable for operation within an enclave. For example, an enclave-loadable shared object may avoid utilization of non-enclave memory. In such circumstances, the enclave-loadable shared object may be loaded to the enclave and may operate within the enclave. In some circumstances, a shared object may be a non-enclave-loadable shared object. A non-enclave-loadable shared object may be a shared object that interacts with a non-enclave device, as described regarding FIG. 3C, a kernel shared object, and/or the like.

In some circumstances, it may be desirable to provide an enclave shared object. In at least one embodiment, an enclave shared object relates to a shared object that was created for operation in an enclave mode.

In at least one embodiment, an enclave shared object relates to an enclave specialized shared object. In at least one embodiment, an enclave specialized shared object relates to a shared object that has been designed to operate within an enclave. For example, the enclave specialized shared object may perform privileged operations that may be undesirable to perform outside of an enclave, such as encryption or decryption of sensitive information. Without limiting the scope of the claims in any way, at least one technical effect associated with providing an enclave specialized shared object is to allow for secure operations within the enclave shared object. For example, the processor may preclude non-enclave programs from effecting and/or inspecting an enclave specialized shared object by way of reading from and/or writing to enclave memory. In at least one embodiment, an enclave includes at least one enclave specialized shared object. In at least one embodiment, the enclave specialized shared object relates to a shared object absent instructions in a non-enclave memory and absent data in a non-enclave memory.

In some circumstances, availability of enclave shared objects of one computing system may differ from availability of enclave shared objects of a different computing system. For example, a computing system may provide an enclave graphics accelerator driver, and a different computing system may provide a trampoline graphics accelerator driver. In such circumstances, it may be desirable to allow a program to be agnostic to whether a shared object relates to an enclave shared object or a trampoline shared object. In at least one embodiment, an apparatus determines whether a shared object dependency corresponds to an enclave shared object. In at least one embodiment, correspondence between a shared object dependency and an enclave shared object relates to correspondence of identity, of function of handle, and/or the like. In at least one embodiment, the apparatus causes association between the shared object dependency and the enclave shared object in circumstances where the shared object dependency corresponds to the enclave shared object. In at least one embodiment, the apparatus causes association between the shared object dependency and a trampoline shared object in circumstances where the shared object dependency fails to correspond to the enclave shared object.

In some circumstances, one or more shared objects may not be an enclave-loadable shared object. In such circumstances, it may be desirable to provide a way for an enclave program to utilize a function associated with the shared object in the absence of an enclave shared object that provides the function. However, as previously stated, in enclave mode, the processor may preclude the non-enclave shared object from accessing data from the enclave memory. This preclusion may prevent the non-enclave shared object from reading and/or writing parameters associated with utilization of the shared object. For example, if the enclave program invokes the shared object and passes a parameter that is stored within enclave memory to the shared object, the processor may preclude the non-enclave shared object from accessing the parameter. Therefore, for at least this reason, it may be desirable to provide a trampoline shared object. In at least one embodiment, a trampoline shared object relates to an enclave shared object that causes invocation of a function associated with a non-enclave shared object. The trampoline shared object may replicate data associated with the shared object, such as data associated with a function call, from enclave memory to non-enclave memory. In at least one embodiment, the replicated data in the non-enclave memory may be received by a non-enclave shared object, such as non-enclave-loadable shared object 328, non-enclave-loadable shared object 329, and/or the like. In at least one embodiment, an ELoader may receive the replicated data and provide the replicated data to the shared object by way of invocation of the shared object. In at least one embodiment, invocation of the non-enclave-loadable shared object may be similar as described regarding FIGS. 1A-1B, such as by way of function call 343 and/or syscall 344.

In at least one embodiment, the trampoline shared object causes transfer of operation to a non-enclave shared object that corresponds to the trampoline shared object. For example, the trampoline shared object may interact with an enclave proxy, for example by function call 348, to cause invocation of the non-enclave shared object, similarly as described regarding FIGS. 4C-4D. In at least one embodiment, a non-enclave shared object corresponds to a trampoline shared object by providing, at least part of, the services provided by the trampoline shared object. In at least one embodiment, transfer of operation to a non-enclave mode may be caused by invocation of an OCall operation.

In at least one embodiment, an enclave program invokes an enclave-loadable shared object, such as an enclave-loadable non-enclave shared object, an enclave specialized shared object, and/or a trampoline shared object. Invocation of the enclave-loadable shared object may be similar as described regarding FIGS. 1A-1B. For example, an enclave program may cause invocation of the enclave-loadable shared object based, at least in part, on invocation of the shared object dependency. In another example, an enclave program may cause invocation of the trampoline shared object based, at least in part, on invocation of the shared object dependency. In the example of FIG. 3B, enclave program 325 invokes enclave-loadable shared object 326 by way of invocation 346, and invokes trampoline shared object 327 by way of invocation 347. Enclave loadable shared object 326 may be an enclave specialized shared object, an enclave loadable non-enclave shared object, a trampoline shared object, and/or the like.

FIG. 3C is a block diagram illustrating an enclave according to at least one embodiment. In the example of FIG. 3C, enclave dynamic linker (EDL) 353, enclave program 355, enclave specialized shared object 356 and trampoline shared object 357 operate in enclave mode 351, and enclave loader (ELoader) 354 operates in a non-enclave mode 352. In the example of FIG. 3C, ELoader 354 and EDL 353 interact with each other by way of E/O calls interaction 372. In the example of FIG. 3C, ELoader 354 creates enclave mode 351 by way of creation interaction 371. In the example of FIG. 3C, enclave program 355 invokes enclave shared object 356 by way of invocation 376, and invokes trampoline shared object 357 by way of invocation 377. In the example of FIG. 3C, EDL 353 comprises enclave proxy 362 and linker 361. In the example of FIG. 3C, trampoline shared object 357 invokes enclave proxy 362, for example by way of function call 378. In the example of FIG. 3C, ELoader 354 comprises enclave creator 363 and enclave bridges 365. In the example of FIG. 3C, ELoader 354 invokes non-enclave-loadable shared object 358 by way of function call 358 and invokes non-enclave-loadable shared object 359 by way of syscall 374, syscall interface 360, and function call 375.

In at least one embodiment, a program interacts with a device by way of a shared object. For example, the shared object may relate to a driver for a device. In such an example, the device may be a graphics accelerator and the shared object may be a graphics accelerator driver.

In some circumstances, it may be desirable to provide for secure interaction between a program and a device. For example, it may be desirable to provide for communication with a device in a manner that does not involve non-enclave memory. For example, it may be desirable to provide for a protected audio video path (PAVP) by way of such communication. In another example, the device may relate to a communication device. In such an example, it may be desirable to utilize a secured interaction, such as secure socket layer (SSL) interaction, which benefits from the security provided by the enclave. In such examples, it may be desirable to provide an enclave shared object that interacts with a device.

In at least one embodiment, an enclave specialized shared object relates to interaction with a device. In at least one embodiment, the enclave specialized shared object interacts with the device by way of an enclave privileged interaction. In at least one embodiment, the device is aware that interaction is enclave privileged interaction. Such awareness may allow for performance of secure operations, trusted operations, and/ or the like. In at least one embodiment, enclave privileged interaction occurs absent instructions in a non-enclave memory and absent data in a non-enclave memory. For example, enclave privileged interaction may preclude usage of non-enclave memory. In at least one embodiment, the device is on the same chip as an enclave memory. Without limiting the scope of the claims in any way, at least one technical effect of the device being on the same chip as the enclave memory is to allow for preclusion of access to the enclave privileged interaction between the shared enclave shared object and the device.

In at least one embodiment, a trampoline shared object relates to a device. In at least one embodiment, the trampoline shared object interacts with the device by way of non-enclave privileged interaction. In at least one embodiment, non-enclave privileged interaction relates to interaction unassociated with enclave memory. In the example of FIG. 3C, trampoline shared object 357 may interact with device 381 by way of non-enclave privileged interaction 380, through enclave proxy 362 and enclave bridges 365.

FIGS. 4A-4E are interaction diagrams illustrating interaction associated with an enclave according to at least one embodiment. The example of FIGS. 4A-4E are merely examples of interaction, and do not limit the scope of the claims. For example, number of modules may vary, specific interactions may vary, order of interactions may vary, and/or the like.

Figure 4A:
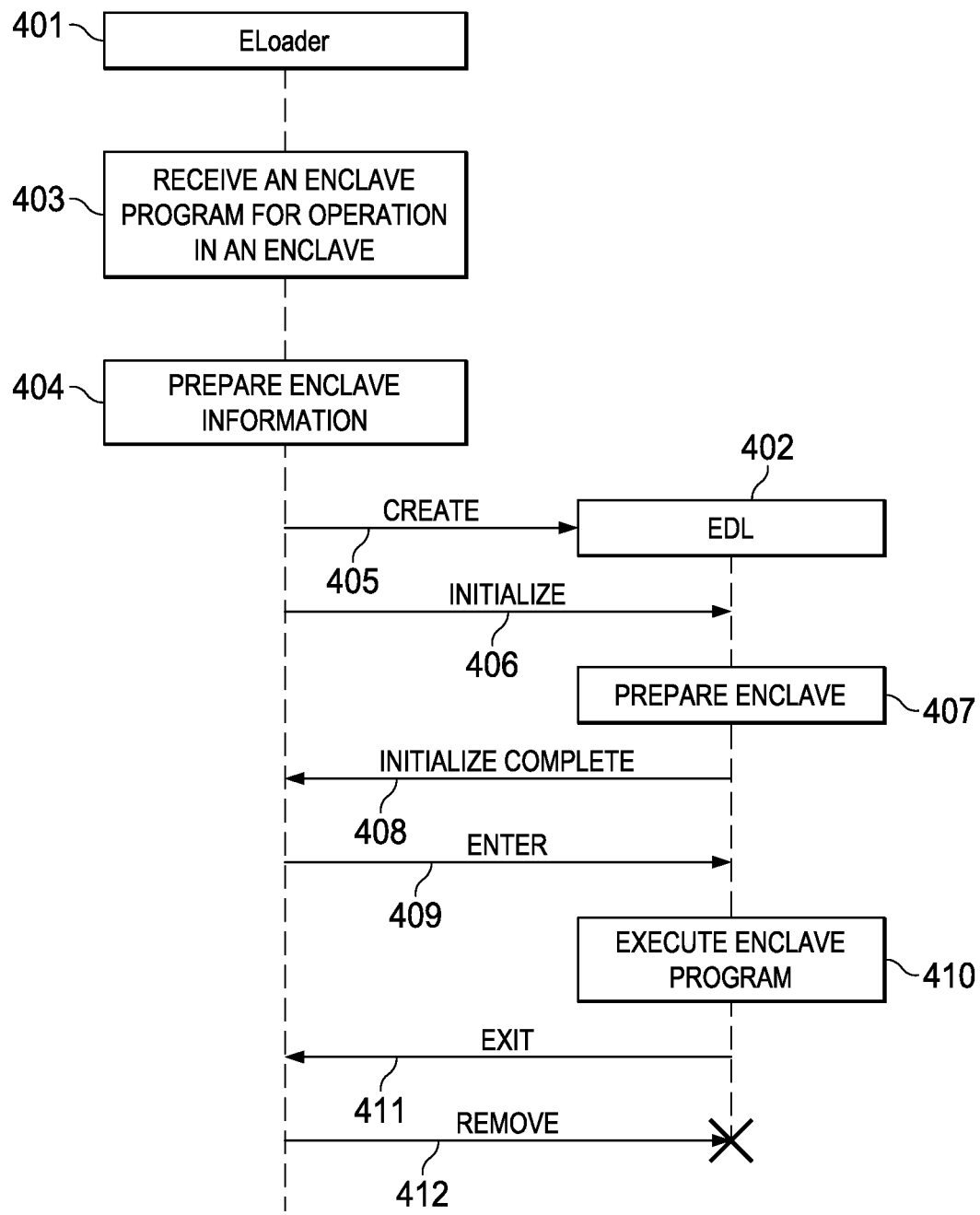

FIG. 4A is an interaction diagram illustrating interaction associated with an enclave according to at least one embodiment. The example of FIG. 4A relates to interaction between ELoader 401 and EDL 402.

At block 403, the ELoader receives an enclave program for operation in an enclave. The ELoader may receive the enclave program from an operating system, a kernel, and/or the like. The enclave program may relate to any program, such as program written to be an enclave program, a program written without consideration of the program being an enclave program, and/or the like. The ELoader may determine whether the program is an enclave program or a non-enclave program. There may be some circumstances where the ELoader determines a program to be an enclave program, and other circumstances where the ELoader determines the same program to be a non-enclave program. For example, the ELoader may utilize security policy information, configuration file information, environmental information, command line information, and/or the like, to evaluate such circumstances.

At block 404, the ELoader prepares enclave information. In at least one embodiment, enclave information relates to information associated with execution of the enclave program. For example, enclave information may relate to shared object dependencies, enclave size, amount of memory used by the enclave program, amount of memory associated with enclave program instructions, whether the enclave program utilizes threads, the enclave program instructions, and/or the like. Preparation of enclave information may comprise determination of enclave size, determination of shared object dependencies, determination of availability of enclave shared objects, determination of whether a shared object is an enclave-loadable shared object, determination of availability of enclave specialized shared objects, determination of availability of trampoline shared objects, and/or the like.

At interaction 405, the ELoader creates the EDL. The creation of the EDL may be part of creation of the enclave. The ELoader may create the EDL by way of an ECreate operation.

At interaction 406, the ELoader initializes the EDL. In at least one embodiment, the ELoader sends the enclave program to the EDL by way of initialize interaction 406. In such an example, the EDL receives the enclave program by way of interaction 406.

At block 407, the EDL prepares the enclave. Enclave preparation may comprise setting up the enclave stack, setting up the enclave heap, evaluating shared object information, linking the enclave program and the shared object information, etc. In at least one embodiment, shared object information relates to a list of shared objects. The list of shared objects may comprise an address associated with the shared object, an identity of the shared object, a handle associated with the shared object, and/or the like. In at least one embodiment, the shared object information is position independent such that address information relates to an offset from the base address of the enclave memory.

Upon receiving interaction 408 indicating that initialization is complete, the ELoader may provide a directive for the EDL to enter into execution of the enclave program at interaction 409. In at least one embodiment, interaction 409 relates to an EEnter operation.

At block 410, the EDL causes execution of the enclave program. For example, the EDL may invoke the entry point of the main executable instructions of the enclave program. Upon completion of execution, the EDL sends a notification to the ELoader indicating execution termination of the enclave program at interaction 411. Upon receiving interaction 411, the ELoader may remove the EDL at interaction 412. In at least one embodiment, the ELoader removes the EDL by way of removing the enclave, such as by way of an ERemove operation.

Figure 4B:
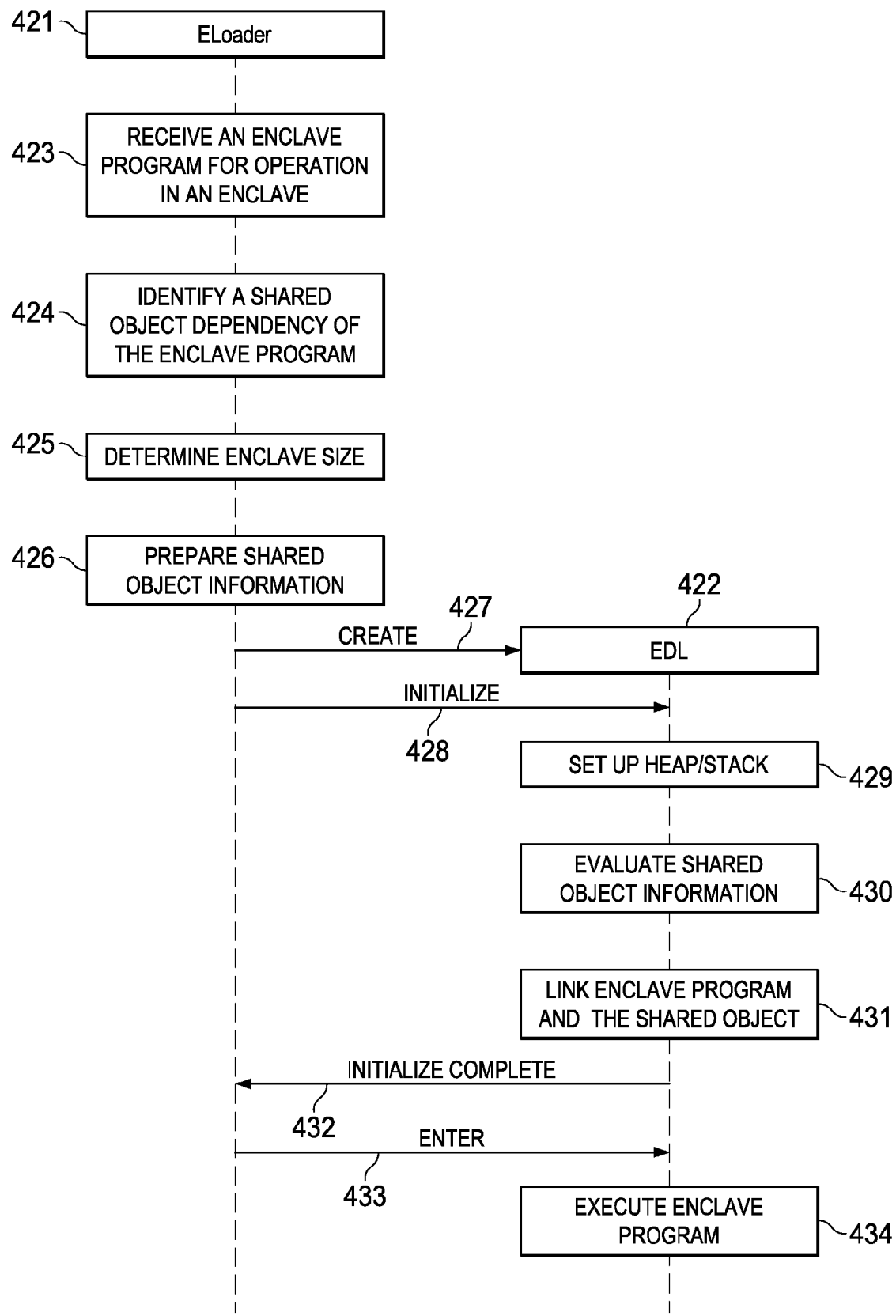

FIG. 4B is an interaction diagram illustrating interaction associated with an enclave according to at least one embodiment. The example of FIG. 4B relates to interaction between ELoader 421 and EDL 422.

At block 423, the ELoader receives an enclave program for operation in an enclave, similarly as described regarding block 403 of FIG. 4A. At block 424, the ELoader identifies at least one shared object dependency of the enclave program. Identification of the shared object dependency may comprise evaluating the enclave program to determine shared object dependencies. In at least one embodiment, identification of the shared object dependency comprises evaluating the enclave program to identify a function call operation. In at least one embodiment, identifying a shared object comprises determination whether the shared object dependency corresponds to at least one enclave shared object. For example, the ELoader may utilize a list of available enclave shared objects. In at least one embodiment, identifying a shared object comprises identifying a trampoline shared object. For example, if the ELoader determines that the shared object dependency fails to correspond to at least one enclave shared object, the ELoader may identify a trampoline shared object that corresponds to the shared object dependency.

At block 425, the ELoader determines enclave size. Determination of enclave size may be based, at least in part, on utilization of threads by the enclave program, data structures used by the enclave program, configuration file information, and/or the like. In at least one embodiment, enclave size is based, at least in part, on the identified shared object. At block 426, the ELoader prepares shared object information. Preparation of the shared object information may relate to evaluating the identified shared object dependency and any identified shared object.

At interaction 427, the ELoader creates the EDL, similarly as described regarding interaction 405 of FIG. 4A. At interaction 428, the ELoader initializes the EDL, similarly as described regarding interaction 406 of FIG. 4A. In at least one embodiment, the ELoader may send the shared object information to the EDL at interaction 428. In at least one embodiment, the EDL may receive the shared object information from the ELoader by way of interaction 428.

At block 429, the EDL sets up the heap and the stack for the enclave. The heap and the stack may be based, at least in part on enclave information, shared object information, and/or the like. At block 430, the EDL evaluates shared object information. Evaluation of shared object information may comprise identifying a shared object, parsing the shared object information, initializing the heap, and/or the like.

At block 431, the EDL causes association between a shared object dependency of the enclave program and an enclave shared object. For example, in circumstances where the shared object dependency corresponds to an enclave shared object the EDL causes association between a shared object dependency of the enclave program and the enclave shared object. In another example, in circumstances where the shared object dependency fails to correspond to the enclave shared object, the EDL causes association between the shared object dependency and an enclave-loadable non-enclave shared object. In at least one embodiment, causation of association between the shared object dependency and the enclave shared object comprises linkage of the shared object dependency to the enclave shared object. For example, the EDL may link the enclave program and the enclave shared object. In at least one embodiment, causation of association between the shared object dependency and the enclave-loadable non-enclave shared object comprises linkage of the shared object dependency to the enclave-loadable non-enclave shared object. For example, the EDL may link the enclave program and the trampoline shared object.

FIG. 4C is an interaction diagram illustrating interaction associated with an enclave according to at least one embodiment. The example of FIG. 4C relates to interaction among enclave bridge 441, enclave proxy 442, enclave program 443, trampoline shared object 444, and non-enclave-loadable shared object 445.

In the example of FIG. 4C, the enclave program performs operations at block 446. The operations performed at block 446 may be any operations associated with the enclave program, such as operations associated with enclave program instructions, thread management instructions, and/or the like. In at least one embodiment, the enclave program causes invocation of the trampoline shared object at interaction 447. In at least one embodiment, invocation of the trampoline shared object comprises causation of transfer of operation to a non-enclave shared object that corresponds to the trampoline shared object. Invocation of the trampoline shared object may be similar as described regarding FIGS. 1A-1B, FIGS. 3A-3C, FIG. 7, FIG. 8, and/or the like. In at least one embodiment, invocation of the trampoline shared object causes invocation of the enclave proxy at block 448. In at least one embodiment, the invocation of the enclave proxy may be associated with data for the non-enclave shared object. In such an embodiment, invocation of the trampoline shared object comprises replication of data associated with the function call from at least one enclave memory to at least one non-enclave memory, similarly as described regarding FIGS. 2A-2B and FIG. 3B. In the example of FIG. 4C, enclave proxy 442 replicates data to non-enclave memory at block 449.

In at least one embodiment, the enclave proxy causes transfer of operation to a non-enclave mode. The transfer of operation may relate to sending a directive that identifies a non-enclave shared object and/or the non-enclave memory to which data was replicated. In the example of FIG. 4C, enclave proxy 442 causes transfer of operation to enclave bridge 441 by way of an OCall operation at interaction 450. The OCall operation may comprise information indicative of a directive identifying non-enclave shared object 445. The OCall operation may comprise information indicative of the data which was replicated in non-enclave memory. In at least one embodiment, receipt of an OCall interaction that comprises information that identifies a non-enclave shared object causes invocation of the non-enclave shared object. The invocation may be similar as described regarding FIGS. 1A-1B and FIGS. 3A-3C. In the example of FIG. 4C, the enclave bridge invokes the non-enclave-loadable shared object at interaction 451.

The non-enclave-loadable shared object performs operations at block 452. The operation may relate to instructions associated with fulfillment of a service associated with the invocation of interaction 451. Upon completion of the operations of block 452, the non-enclave-loadable shared object returns control to the enclave bridge at interaction 453. Receipt of control from the non-enclave-loadable shared object may cause the enclave bridge to transfer control to the enclave proxy.

In at least one embodiment, the enclave bridge may cause transfer of operation to an enclave mode. The transfer of operation may relate to sending a directive that identifies the non-enclave shared object, the trampoline shared object, and/or any non-enclave memory to which data was provided by the non-enclave shared object. In the example of FIG. 4C, enclave bridge 441 causes transfer of operation to enclave proxy 442 by way of an ECall operation at interaction 454. The ECall operation may comprise information indicative of the data in non-enclave memory associated with the operations of the non-enclave shared object. In at least one embodiment, the enclave proxy replicates data received from the enclave bridge from non-enclave memory to enclave memory at block 455. Enclave proxy 442 returns control to trampoline shared object 444 at interaction 456. In at least one embodiment, interaction 456 comprises information indicative of the data replicated to enclave memory at block 456. In at least one embodiment, return of control to the trampoline shared object causes return of control to the enclave program and interaction 457. In at least one embodiment, interaction 457 comprises information indicative of the data replicated to enclave memory at block 456.

Figure 4D:
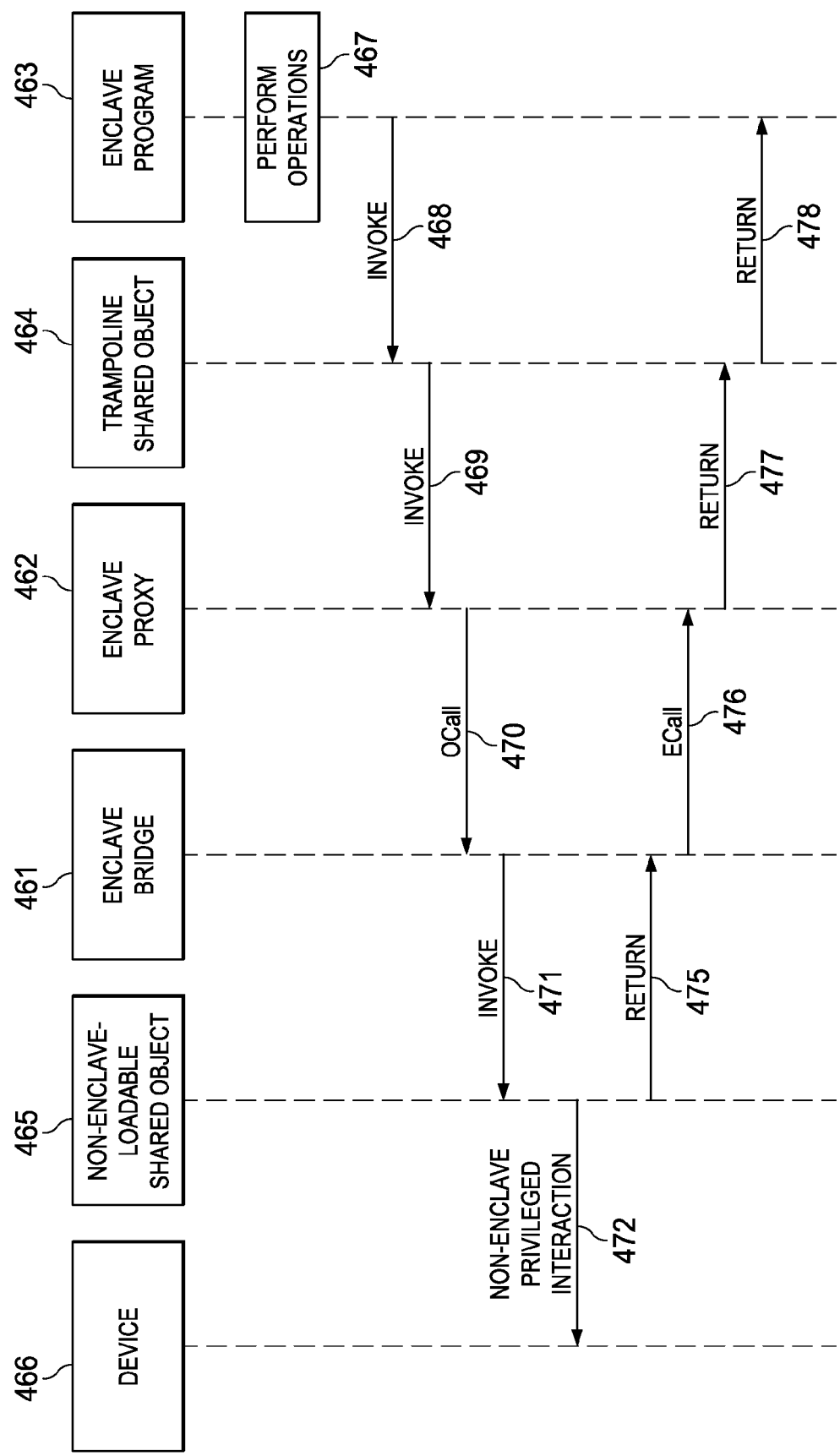

FIG. 4D is an interaction diagram illustrating interaction associated with an enclave according to at least one embodiment. The example of FIG. 4D relates to interaction among enclave bridge 461, enclave proxy 462, enclave program 463, trampoline shared object 464, non-enclave shared object 465, and device 466.

In the example of FIG. 4D, the enclave program performs operations at block 467, similarly as described regarding block 446 of FIG. 4C. Enclave program 463 invokes trampoline shared object 464 by way of interaction 468, similarly as described regarding interaction 447 of FIG. 4C. Trampoline shared object 464 invokes enclave proxy 462 by way of interaction 469, similarly as described regarding interaction 448 of FIG. 4C. Enclave proxy 462 causes transfer of control to enclave bridge 461 by way of interaction 470, similarly as described regarding interaction 450 of FIG. 4C. Enclave bridge 461 invokes non-enclave-loadable shared object 465 by way of interaction 471, similarly as described regarding interaction 451 of FIG. 4C.

In at least one embodiment, invocation of a non-enclave-loadable shared object may comprise non-enclave privileged interaction between the non-enclave shared object and a device. The non-enclave privileged interaction may be similar as described regarding FIG. 3C. Non-enclave-loadable shared object 465 interacts with device 466 by way of non-enclave privileged interaction 472. Non-enclave-loadable shared object 465 returns control to enclave bridge 461 by way of interaction 475, similarly as described regarding interaction 453 of FIG. 4C. Enclave bridge 461 transfers control to enclave proxy 462 by way of interaction 476, similarly as described regarding interaction 454 of FIG. 4C. Enclave proxy returns control to trampoline shared object 464 by way of interaction 477, similarly as described regarding interaction 456 of FIG. 4C. Trampoline shared object 464 returns control to enclave program 463 by way of interaction 478, similarly as described regarding interaction 457 of FIG. 4C.

Figure 4E:
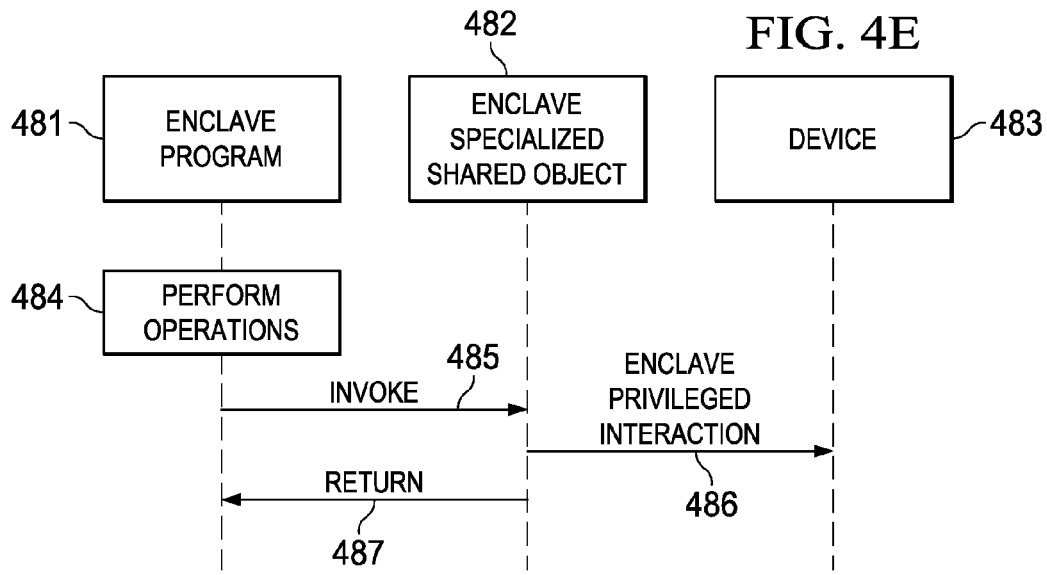

FIG. 4E is an interaction diagram illustrating interaction associated with an enclave according to at least one embodiment. The example of FIG. 4E relates to interaction enclave program 481, enclave specialized shared object 482, and device 483. Device 483 may be similar as described regarding device 382 of FIG. 3C.

In the example of FIG. 4E, the enclave program performs operations at block 484, similarly as described regarding block 446 of FIG. 4C. In at least one embodiment, the enclave program causes invocation of the enclave specialized shared object at interaction 485. Invocation of the enclave shared object may be similar as described regarding FIGS. 1A-1B, FIGS. 3A-3C, FIG. 7, FIG. 8, and/or the like. In at least one embodiment, invocation of the enclave specialized shared object causes interaction with device 483 at interaction 486. In at least one embodiment, interaction between the enclave specialized shared object and the device is enclave privileged interaction, similar as described regarding FIG. 3C. At interaction 487, the enclave specialized shared object returns control to the enclave program.

Figure 5:
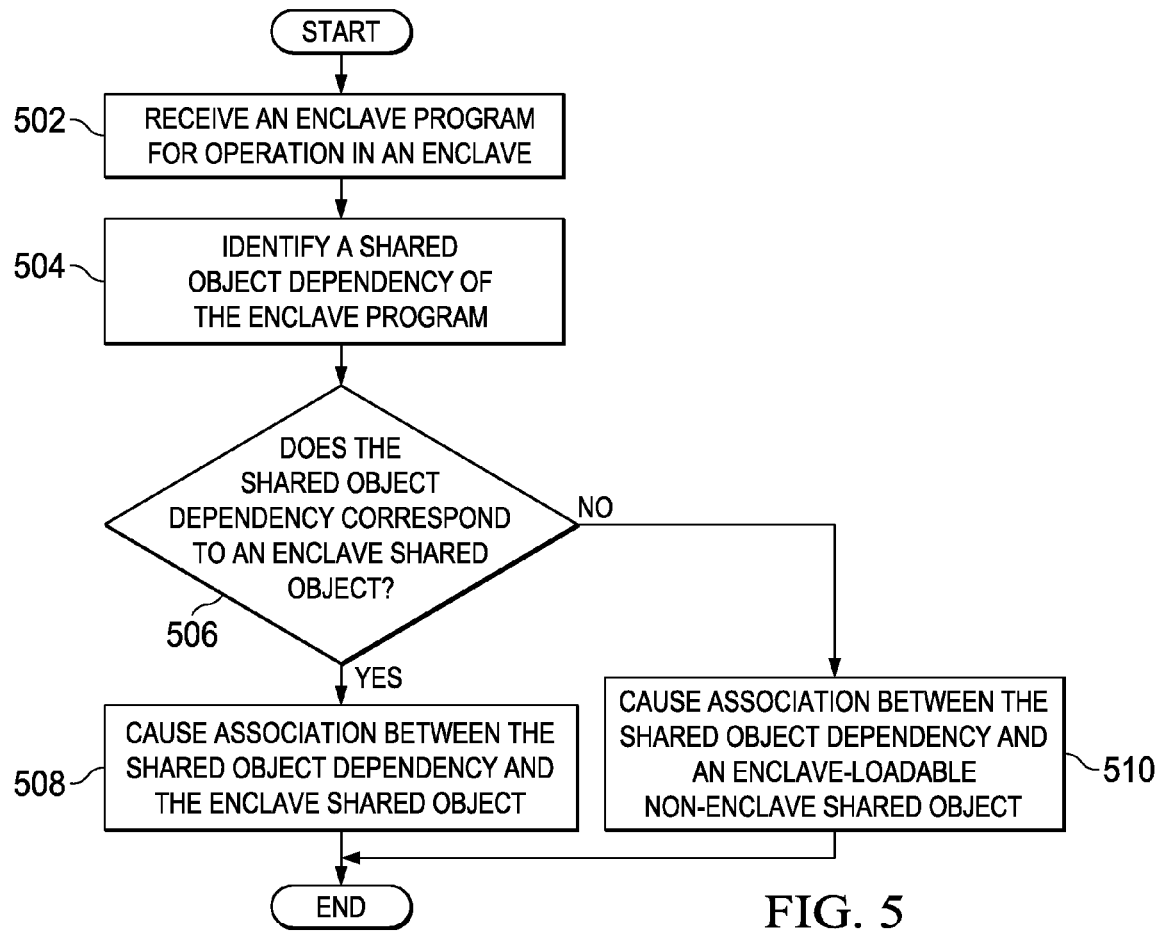
FIG. 5 is a flow diagram illustrating activities associated with causing association between a shared object and an enclave program according to at least one embodiment.

FIG. 5 is a flow diagram illustrating activities associated with causing association between a shared object and an enclave program according to at least one embodiment. In at least one embodiment, there is a set of operations that corresponds to the activities of FIG. 5. An apparatus, for example computing system 1100 of FIG. 10, or a portion thereof, may utilize the set of operations. The apparatus may comprise means, including, for example processor 1000 of FIG. 9, for performing such operations. In an embodiment, an apparatus, for example computing system 1100 of FIG. 10, is transformed by having memory, for example memory 1110 of FIG. 10, comprising computer code configured to, working with a processor, for example processor 1102 of FIG. 10, cause the apparatus to perform set of operations of FIG. 5.

At block 502, the apparatus receives an enclave program for operation in an enclave. The receiving may be similar as described regarding block 403 of FIG. 4A, interaction 406 of FIG. 4A, and/or the like. The enclave program and operation in an enclave may be similar as described regarding FIGS. 2A-2B and FIGS. 3A-3C.

At block 504, the apparatus identifies at least one shared object dependency of the enclave program. The shared object, shared object dependency, and identification may be similar as described regarding FIGS. 1A-1B, FIGS. 2A-2B, FIGS. 3A-3C, and FIGS. 4A-4E. In at least one embodiment, identification of the shared object dependency comprises receiving a notification of an exception identifying invocation of a syscall operation, similarly as described regarding block 704 of FIG. 7.

At block 506, the apparatus determines whether the shared object dependency corresponds to at least one enclave shared object. The enclave shared object and correspondence to the enclave shared object may be similar as described regarding FIGS. 2A-2B and FIGS. 3A-3C. If the apparatus determines that the shared object dependency corresponds to the enclave shared object, flow proceeds to block 508. If the apparatus determines that the shared object dependency fails to correspond to the enclave shared object, flow proceeds to block 510.

At block 508, the apparatus causes association between the shared object dependency and the enclave shared object. In at least one embodiment, the apparatus performs the action of block 508 in circumstances where the shared object dependency corresponds to the enclave shared object. Association and causation of association may be similar as described regarding FIGS. 1A-1B, FIGS. 3A-3C, and/or the like. For example, causation of association between the shared object dependency and the enclave shared object may comprise linkage of the shared object dependency to the enclave shared object.

At block 510, the apparatus causes association between the shared object dependency and an enclave-loadable non-enclave shared object. In at least one embodiment, the apparatus performs the action of block 510 in circumstances where the shared object dependency fails to correspond to the enclave shared object. Association and causation of association may be similar as described regarding FIGS. 1A-1B, FIGS. 3A-3C, and/or the like. For example, causation of association between the shared object dependency and the enclave-loadable non-enclave shared object may comprise linkage of the shared object dependency to the enclave-loadable non-enclave shared object.

Figure 6:
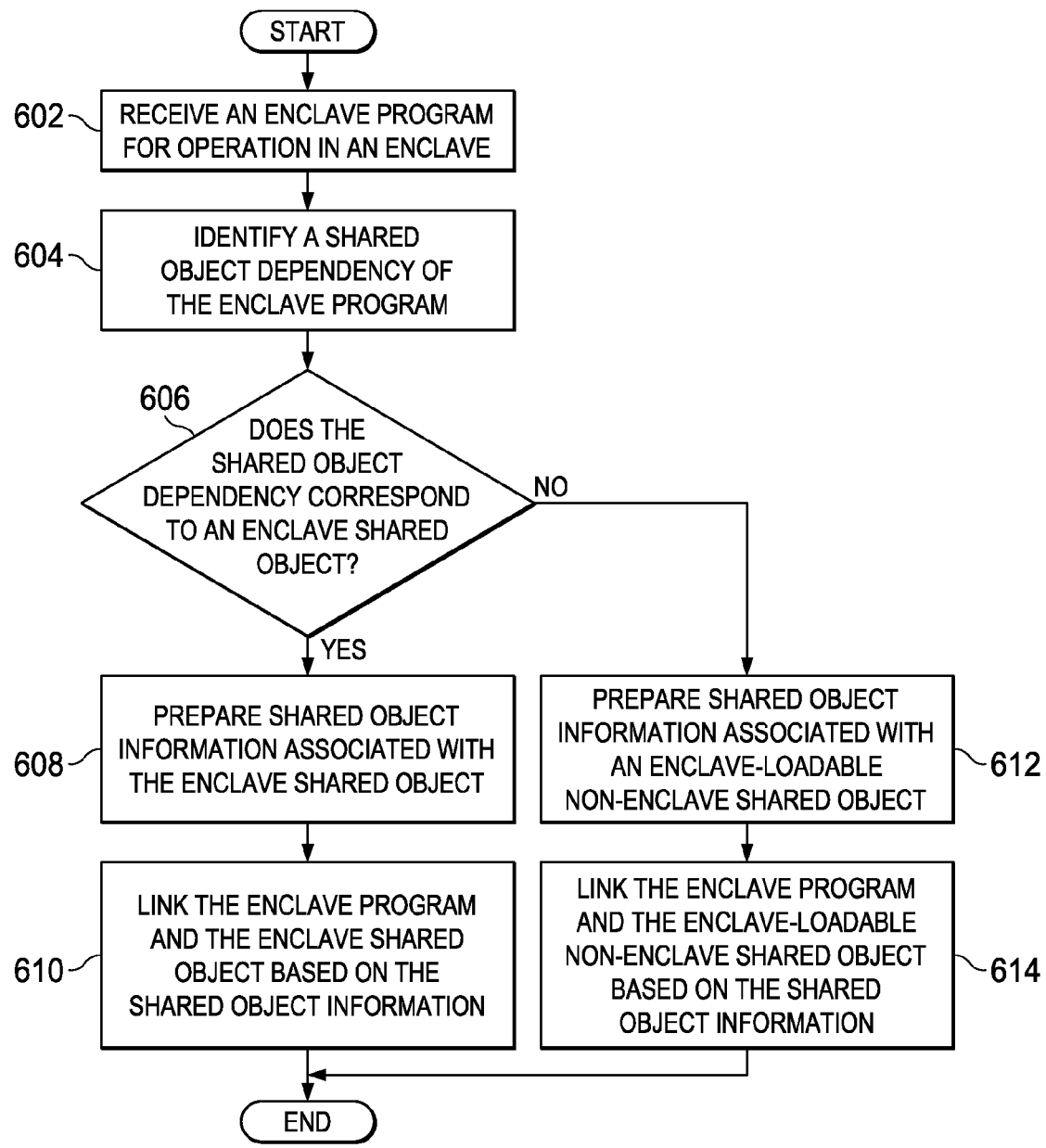
FIG. 6 is a flow diagram illustrating activities associated with causing association between a shared object and an enclave program according to at least one embodiment.

FIG. 6 is a flow diagram illustrating activities associated with causing association between a shared object and an enclave program according to at least one embodiment. In at least one embodiment, there is a set of operations that corresponds to the activities of FIG. 6. An apparatus, for example computing system 1100 of FIG. 10, or a portion thereof, may utilize the set of operations. The apparatus may comprise means, including, for example processor 1000 of FIG. 9, for performing such operations. In an embodiment, an apparatus, for example computing system 1100 of FIG. 10, is transformed by having memory, for example memory 1110 of FIG. 10, comprising computer code configured to, working with a processor, for example processor 1102 of FIG. 10, cause the apparatus to perform set of operations of FIG. 6.

At block 602, the apparatus receives an enclave program for operation in an enclave, similarly as described regarding block 502 of FIG. 5. At block 604, the apparatus identifies at least one shared object dependency of the enclave program, similarly as described regarding block 504 of FIG. 5. At block 606, the apparatus determines whether the shared object dependency corresponds to at least one enclave shared object, similarly as described regarding block 506 of FIG. 5. If the apparatus determines that the shared object dependency corresponds to the enclave shared object, flow proceeds to block 608. If the apparatus determines that the shared object dependency fails to correspond to the enclave shared object, flow proceeds to block 612.

At block 608, the apparatus prepares shared object information associated with the enclave shared object, similarly as described regarding block 426 of FIG. 4B. At block 610, the apparatus links the enclave program and the enclave shared object based, at least in part, on the shared object information, similarly as described regarding block 431 of FIG. 4B.

At block 612, the apparatus prepares shared object information associated with an enclave-loadable non-enclave shared object, similarly as described regarding block 426 of FIG. 4B. At block 614, the apparatus links the enclave-loadable non-enclave program and the enclave shared object based, at least in part, on the shared object information, similarly as described regarding block 431 of FIG. 4B.

Figure 7:
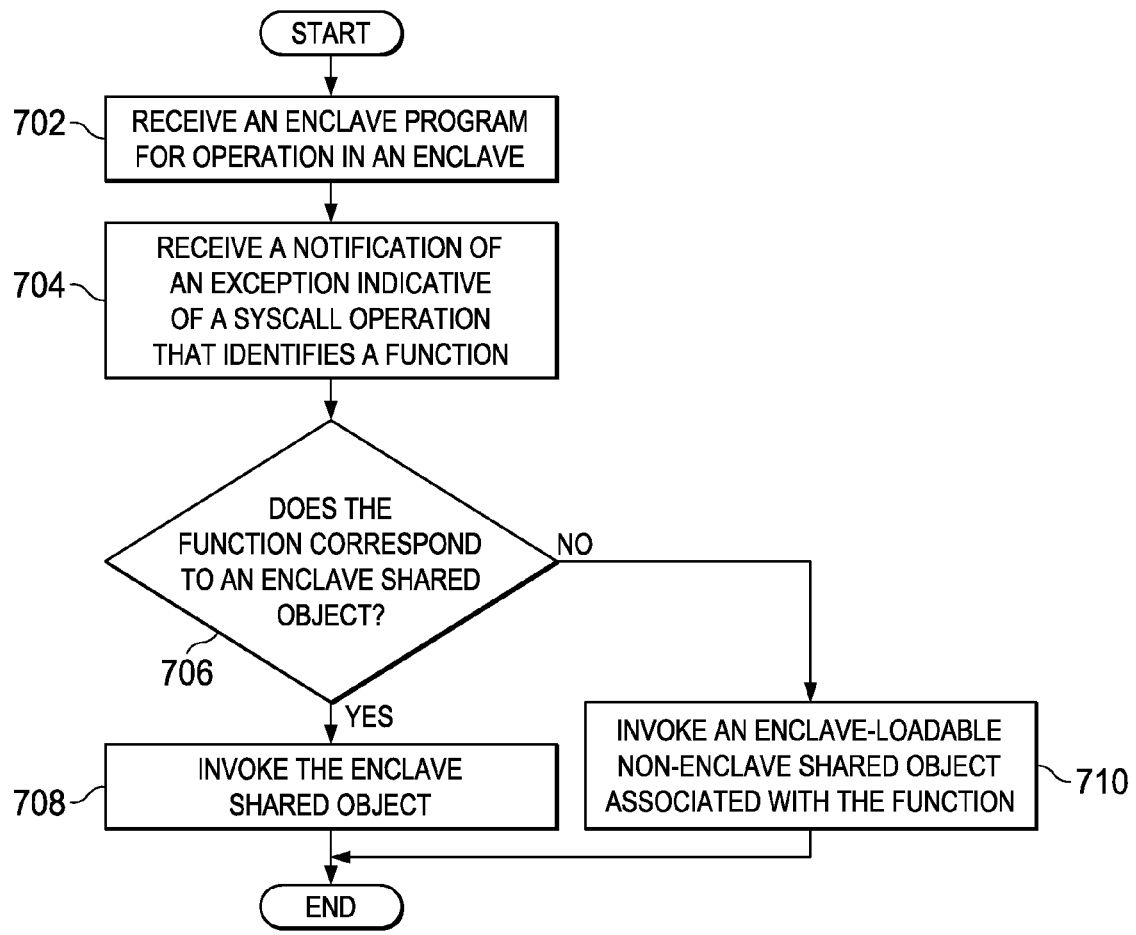
FIG. 7 is a flow diagram illustrating activities associated with causing association between a shared object and an enclave program according to at least one embodiment.

FIG. 7 is a flow diagram illustrating activities associated with causing association between a shared object and an enclave program according to at least one embodiment. In at least one embodiment, there is a set of operations that corresponds to the activities of FIG. 7. An apparatus, for example computing system 1100 of FIG. 10, or a portion thereof, may utilize the set of operations. The apparatus may comprise means, including, for example processor 1000 of FIG. 9, for performing such operations. In an embodiment, an apparatus, for example computing system 1100 of FIG. 10, is transformed by having memory, for example memory 1110 of FIG. 10, comprising computer code configured to, working with a processor, for example processor 1102 of FIG. 10, cause the apparatus to perform set of operations of FIG. 7.

In some circumstances, a program may have a shared object dependency based, at least in part, on a syscall operation, similarly as described regarding FIG. 1B. In such circumstances, it may be desirable to invoke the shared object by way of the syscall. For example, the enclave may trap the syscall operation upon occurrence of an exception being thrown due to lack of availability of an appropriate syscall interface within the enclave. In such circumstances, the apparatus may receive a notification that an exception occurred due to invocation of the syscall operation. For example, an EDL may trap the exception, and invoke a corresponding enclave shared object. In at least one embodiment, identification of the shared object dependency comprises receiving a notification of an exception identifying invocation of a syscall operation. The syscall operation may identify a function.

At block 702, the apparatus receives an enclave program for operation in an enclave, similarly as described regarding block 502 of FIG. 5. At block 704, the apparatus receives a notification of an exception identifying invocation of a syscall operation. In at least one embodiment, the syscall operation identifies a function associated with the software interrupt, similarly as described regarding FIG. 1B. At block 706, the apparatus determines whether the function corresponds to at least one enclave shared object. The enclave shared object and correspondence to the enclave shared object may be similar as described regarding FIGS. 2A-2B and FIGS. 3A-3C. If the apparatus determines that the function corresponds to the enclave shared object, flow proceeds to block 708. If the apparatus determines that the function fails to correspond to the enclave shared object, flow proceeds to block 710.

At block 708, the apparatus causes invocation of the enclave shared object. Invocation of the enclave shared object may be similar as described regarding FIGS. 1A-1B, FIGS. 3A-3C, FIG. 4E, and/or the like. In at least one embodiment, the apparatus identifies the enclave shared object that provides the function, and the invocation is based, at least in part on the identification. In at least one embodiment, causation of association between a shared object dependency and the enclave shared object comprises identification of the enclave shared object that provides the function. For example, an embodiment that combines the actions of FIG. 5 and the actions of FIG. 7, block 508 may comprise identification of the enclave shared object that provides the function.

At block 710, the apparatus causes invocation of an enclave-loadable non-enclave shared object. Invocation of the enclave-loadable non-enclave shared object may be similar as described regarding FIGS. 1A-1B, FIGS. 3A-3C, FIGS. 4C-4D, and/or the like. In at least one embodiment, the apparatus identifies the enclave-loadable non-enclave shared object that provides the function, and the invocation is based, at least in part on the identification. In at least one embodiment, causation of association between a shared object dependency and the enclave-loadable non-enclave shared object comprises identification of the enclave-loadable non-enclave shared object that provides the function. For example, an embodiment, that combines the actions of FIG. 5 and the actions of FIG. 7, block 510 may comprise identification of the enclave-loadable non-enclave shared object that provides the function.

Figure 8:
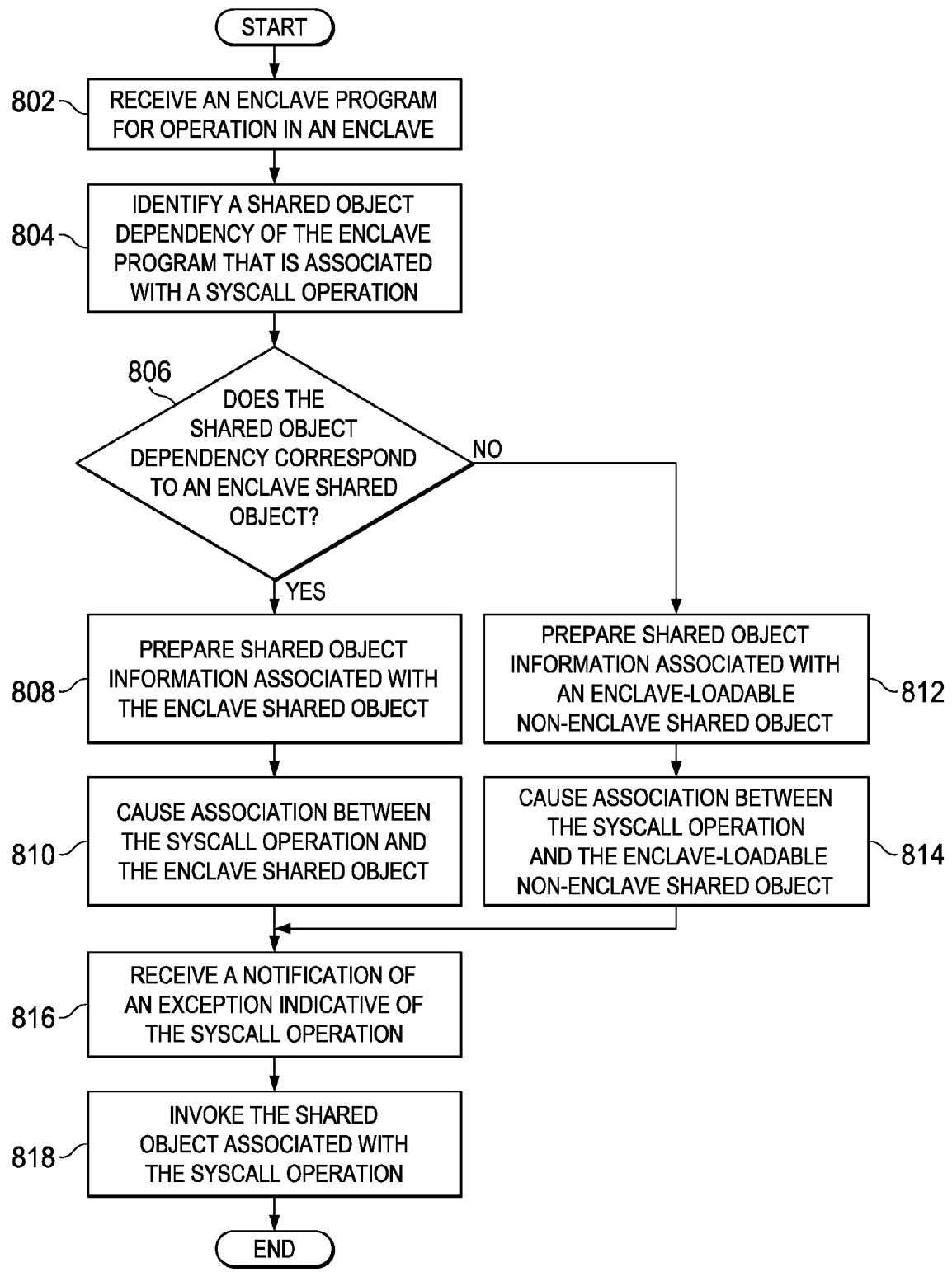
FIG. 8 is a flow diagram illustrating activities associated with causing association between a shared object and an enclave program according to at least one embodiment.

FIG. 8 is a flow diagram illustrating activities associated with causing association between a shared object and an enclave program according to at least one embodiment. In at least one embodiment, there is a set of operations that corresponds to the activities of FIG. 8. An apparatus, for example computing system 1100 of FIG. 10, or a portion thereof, may utilize the set of operations. The apparatus may comprise means, including, for example processor 1000 of FIG. 9, for performing such operations. In an embodiment, an apparatus, for example computing system 1100 of FIG. 10, is transformed by having memory, for example memory 1110 of FIG. 10, comprising computer code configured to, working with a processor, for example processor 1102 of FIG. 10, cause the apparatus to perform set of operations of FIG. 8.

At block 802, the apparatus receives an enclave program for operation in an enclave, similarly as described regarding block 502 of FIG. 5. At block 804, the apparatus identifies at least one shared object dependency of the enclave program that is associated with a syscall operation. The shared object, shared object dependency, association with a syscall operation, and identification may be similar as described regarding FIGS. 1A-1B, FIGS. 2A-2B, FIGS. 3A-3C, and FIGS. 4A-4E. At block 806, the apparatus determines whether the shared object dependency corresponds to at least one enclave shared object, similarly as described regarding block 506 of FIG. 5. If the apparatus determines that the shared object dependency corresponds to the enclave shared object, flow proceeds to block 808. If the apparatus determines that the shared object dependency fails to correspond to the enclave shared object, flow proceeds to block 812.

At block 808, the apparatus prepares shared object information associated with the enclave shared object, similarly as described regarding block 608 of FIG. 6. At block 810, the apparatus causes association between the syscall operation and the enclave shared object, similarly as described regarding block 508 of FIG. 5. Flow proceeds to block 816.

At block 812, the apparatus prepares shared object information associated with the enclave-loadable non-enclave shared object, similarly as described regarding block 612 of FIG. 6. At block 810, the apparatus causes association between the syscall operation and the enclave-loadable non-enclave shared object, similarly as described regarding block 510 of FIG. 5. Flow proceeds to block 816.

At block 816, the apparatus receives a notification of an exception identifying invocation of the syscall operation, similarly as described regarding block 704 of FIG. 7. At block 818, the apparatus invokes the shared object associated with the syscall operation. The invocation may be similar as described regarding block 708 of FIG. 7, block 710 of FIG. 7, and/or the like.

Figure 9:
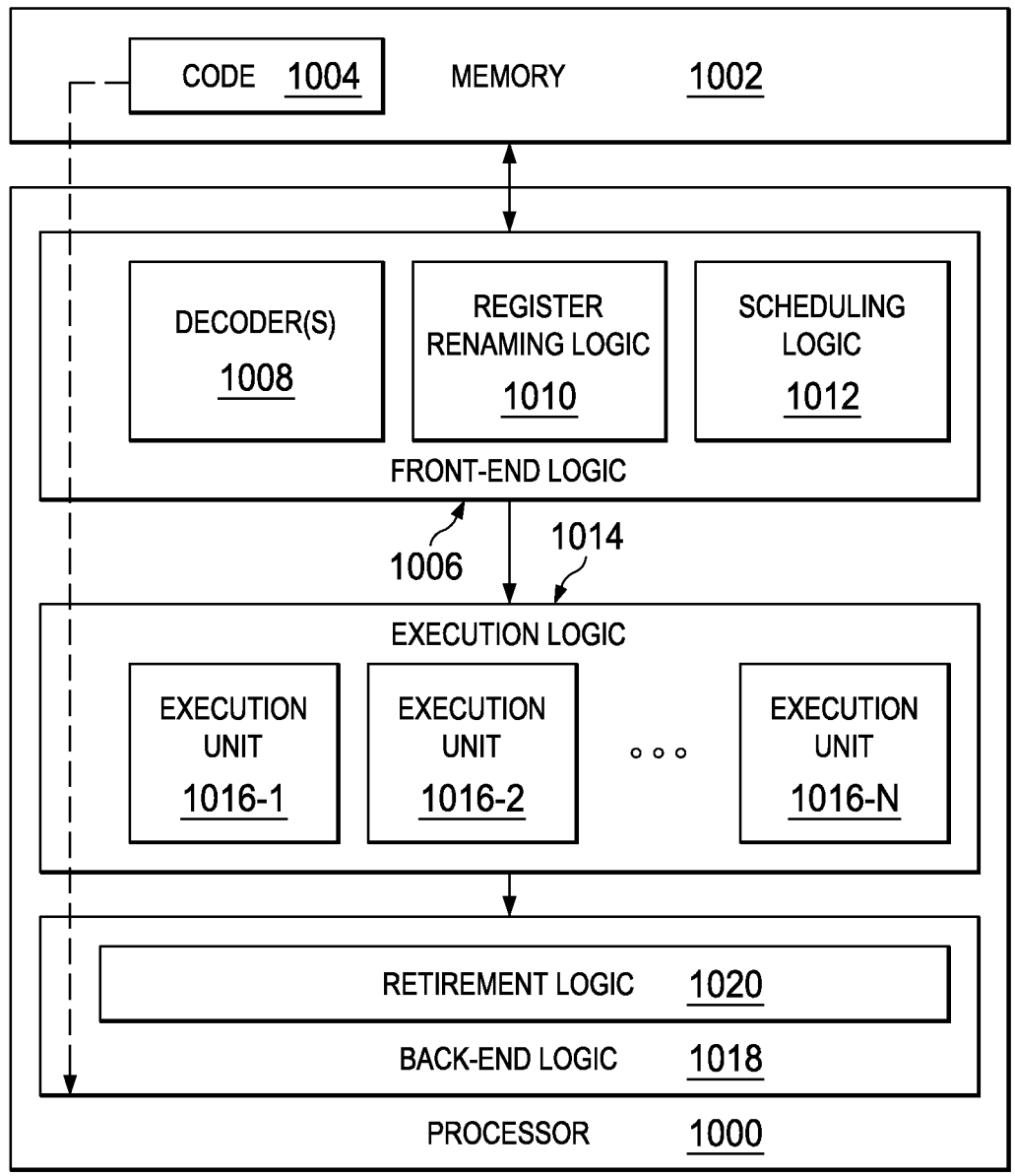
FIG. 9 is a block diagram showing a memory coupled to processor in accordance with an embodiment.
Figure 10:
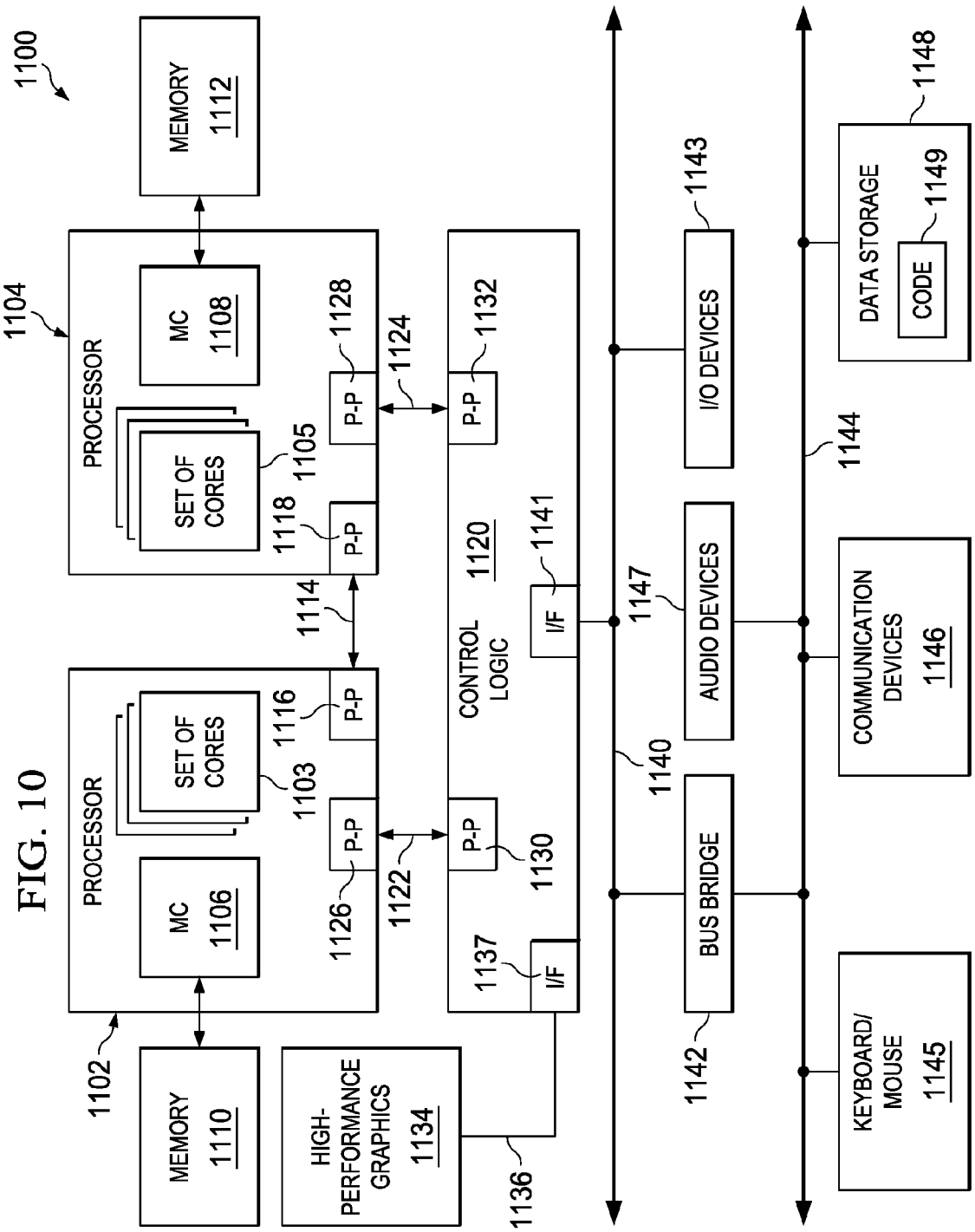
FIG. 10 is a block diagram showing a computing system that is arranged in a point-to-point (PtP) configuration according to an embodiment.

FIG. 9 illustrates a memory 1002 coupled to processor 1000 in accordance with at least one embodiment. Memory 1002 may be any of a wide variety of memories (including various layers of memory hierarchy). The memory 1002 may include code 1004, which may be one or more instructions, to be executed by processor 1000. Processor 1000 follows a program sequence of instructions indicated by code 1004. In at least one embodiment, an instruction enters a front-end logic 1006 and is processed by one or more decoders 1008. The decoder may generate a micro operation such as a fixed width micro operation in a predefined format, or may generate other instructions, microinstructions, control signals, and/or the like, that represent the instruction. Front-end logic 1006 also includes register renaming logic 1010 and scheduling logic 1012, which may allocate resources and queue the micro operation.

Processor 1000 is shown including execution logic 1014 having a set of execution units 1016-1 through 1016-N. At least one embodiment includes a number of execution units dedicated to specific functions or sets of functions. At least one embodiment includes only one execution unit or one execution unit that can perform a particular function. Execution logic 1014 executes the micro operation.

After completion of execution of the micro operations, back-end logic 1018 retires the instructions of code 1004. In one embodiment, processor 1000 allows out of order execution but enforces in order retirement of instructions. Retirement logic 1020 may take a variety of forms (e.g., re-order buffers or the like). In this manner, processor 1000 is transformed during execution of code 1004, at least in terms of the output generated by the decoder, hardware registers, and tables utilized by register renaming logic 1010, and any registers (not shown) modified by execution logic 1014.

Although not illustrated in FIG. 9, a processing element may include other elements on a chip with processor 1000. For example, a processing element may include memory control logic along with processor 1000. The processing element may include I/O control logic and/or may include I/O control logic integrated with memory control logic. The processing element may also include one or more caches.

FIG. 10 illustrates a computing system 1100 that is arranged in a point-to-point (PtP) configuration according to an embodiment. In particular, FIG. 10 shows a system where processors, memory, and input/output devices are interconnected by a number of point-to-point interfaces.

As illustrated in FIG. 10, system 1100 may include several processors, of which only two, processors 1102 and 1104, are shown for clarity. Processors 1102 and 1104 may each include a set of cores 1103 and 1105, which may execute multiple processes of a program. Processors 1102 and 1104 may also each include integrated memory controller logic (MC) 1106 and 1108 to communicate with memories 1110 and 1112, respectively. The memories 1110 and/or 1112 may store various data such as those discussed with reference to memory 1112. In at least one embodiment, memory controller logic 1106 and 1108 is discrete logic separate from processors 1102 and 1104. Processors 1102 and 1104 represent a broad range of processor and memory arrangements including arrangements with single or multi-core processors of various execution speeds and power consumptions, and memory of various architectures (e.g., with one or more levels of caches) and various types (e.g., dynamic random access, FLASH, and so forth).

Processors 1102 and 1104 may be any type of a processor. Processors 1102 and 1104 may exchange data via a point-to-point (PtP) interface 1114 using point-to-point interface circuits 1116 and 1118, respectively. Processors 1102 and 1104 may each exchange data with a control logic 1120 via individual point-to-point interfaces 1122 and 1124 using point-to-point interface circuits 1126, 1128, 1130, and 1132. Control logic 1120 may exchange data with a high-performance graphics circuit 1134 via a high-performance graphics interface 1136, using an interface circuit 1137, which could be a PtP interface circuit. In at least one embodiment, any or all of the PtP links illustrated in FIG. 10 could be implemented as a multi-drop bus rather than a PtP link.

At least one embodiment, as disclosed herein, is provided within the processors 1102 and 1104. At least one embodiment, however, exists in other circuits, logic units, or devices within the system 1100 of FIG. 10. Furthermore, at least one embodiment is distributed throughout several circuits, logic units, or devices illustrated in FIG. 10.

Control logic 1120 may be in communication with a bus 1140 via an interface circuit 1141. Bus 1140 may have one or more devices that communicate over it, such as a bus bridge 1142 and I/O devices 1143. Via a bus 1144, bus bridge 1143 may be in communication with other devices such as a keyboard/mouse 1145 (or other input device such as a touch screen, for example), communication devices 1146 (such as modems, network interface devices, or other types of communication devices that may communicate through a computer network), audio I/O device 1147, a data storage device 1148, and/or the like. Data storage device 1148 may store code 1149 that may be executed by processors 1102 and/or 1104. In at least one embodiment, at least a portion of the bus architectures is implemented with one or more PtP links.

The computer systems depicted in FIGS. 9 and 10 are schematic illustrations of embodiments of computing systems that may be utilized in accordance with various embodiments. It will be appreciated that various components of the systems depicted in FIGS. 9 and 10 may be combined in a system-on-a-chip (SoC) architecture, may be distributed across a plurality of chips, or in any other suitable configuration. For example, at least one embodiment disclosed herein can be incorporated into systems such as, for example, mobile devices such as smart cellular telephones, tablet computers, ultrabook computers personal digital assistants, portable gaming devices, on a desktop computer, a server, a game console, an internet appliance, and/or the like. It will be appreciated that these mobile devices may be provided with SoC architectures in at least some embodiments.

Note that in at least one embodiment, at least one operation, activity, function, etc. outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In at least one embodiment, the logic may be computer program instructions, such as code 1004 of FIG. 9. In at least one embodiment, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In at least one embodiment, the processor transforms an element or an article (e.g., data) from one state or thing to another state or thing by way of the instructions. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

At least one embodiment includes software in order to achieve the activities outlined herein. A module associated with an enclave, for example an ELoader or an EDL, can include memory elements for storing information to be used in achieving the security activities, as discussed herein. Additionally, the module associated with an enclave may include a processor that can execute software to perform the activities, as disclosed herein. These devices may further keep information in any suitable memory element (random access memory (RAM), ROM, EPROM, EEPROM, ASIC, etc.), software, hardware, or in any other suitable component, device, element, or object where appropriate and based on particular needs. Additionally or alternatively, the module associated with an enclave can be software, hardware, firmware or a combination thereof. Any of the memory items discussed herein (e.g., databases, tables, trees, caches, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the components, modules, and/or the like (and their teachings) are readily scalable and can accommodate a large number of components, as well as more complicated/sophisticated arrangements and configurations. Accordingly, the examples provided should not limit the scope or inhibit the broad teachings of the module associated with an enclave as potentially applied to a myriad of other architectures.

It is also important to note that the operations in the preceding flow diagrams illustrate only some of the possible scenarios and patterns that may be executed in association with causing an operation to be performed in relation to a security exception. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A module associated with an enclave may provide substantial flexibility in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure.

OTHER NOTES AND EXAMPLES

Example 1 is an apparatus to provide secure operation comprising: at least one processor, at least one memory, the at least one memory comprising instructions that when executed by the processor, cause the apparatus to perform, at least, the following: receive an enclave program for operation in an enclave, identify at least one shared object dependency of the enclave program, determine whether the shared object dependency corresponds to at least one enclave shared object, and an enclave dynamic linker comprising instructions that when executed by the processor, cause the apparatus to perform, at least, the following: cause association between the shared object dependency and the enclave shared object in circumstances where the shared object dependency corresponds to the enclave shared object, and cause association between the shared object dependency and an enclave-loadable non-enclave shared object in circumstances where the shared object dependency fails to correspond to the enclave shared object.

In example 2, regarding the subject matter of example 1, the enclave dynamic linker comprising instructions that when executed by the processor, cause the apparatus to perform causation of invocation of the enclave shared object based, at least in part, on invocation of the shared object dependency.

In example 3, regarding the subject matter of example 2, invocation of the shared object dependency relates to performance of a function call associated with the shared object dependency and performance of the function call associated with the enclave shared object.

In example 4, regarding the subject matter of examples 2-3, invocation of the shared object dependency relates to invocation of a syscall operation indicative of a syscall function associated with the shared object dependency and performance of a function call of the enclave shared object, the function call corresponding to the syscall function.

In example 5, regarding the subject matter of examples 1-4, the enclave shared object is a trampoline shared object, and further comprising causation of invocation of the trampoline shared object based, at least in part, on invocation of the shared object dependency.

In example 6, regarding the subject matter of example 5, invocation of the trampoline shared object comprises causation of transfer of operation to a non-enclave-loadable shared object that corresponds to the trampoline shared object.

In example 7, regarding the subject matter of example 6, causation of transfer of operation to the non-enclave-loadable shared object comprises sending a directive that identifies the non-enclave-loadable shared object.

In example 8, regarding the subject matter of example 7, wherein sending the directive comprises sending the directive to an enclave loader.

In example 9, regarding the subject matter of example 8, wherein causation of transfer of operation to the non-enclave-loadable shared object comprises invocation of an enclave proxy, and the enclave proxy sends the directive to the enclave loader.

In example 10, regarding the subject matter of example 9, wherein causation of transfer of operation to the non-enclave-loadable shared object comprises invocation of a syscall operation by an enclave loader.

In example 11, regarding the subject matter of example 10, wherein invocation of the trampoline shared object comprises replication of data associated with the function call from at least one enclave memory to at least one non-enclave memory, and wherein causation of transfer of operation to the non-enclave shared object comprises sending a directive that identifies the non-enclave memory.

In example 12, regarding the subject matter of example 11, wherein sending the directive comprises sending the directive to an enclave loader, and wherein causation of transfer of operation to the non-enclave-loadable shared object comprises invocation of an enclave proxy, and the enclave proxy sends the directive to the enclave loader.

Example 13 is at least one computer readable storage medium to provide secure operation comprising instructions that, when executed, cause an apparatus to: receive an enclave program for operation in an enclave, identify at least one shared object dependency of the enclave program, determine whether the shared object dependency corresponds to at least one enclave shared object, cause association between the shared object dependency and the enclave shared object in circumstances where the shared object dependency corresponds to the enclave shared object, and cause association between the shared object dependency and an enclave-loadable non-enclave shared object in circumstances where the shared object dependency fails to correspond to the enclave shared object.

In example 14, regarding the subject matter of example 13, identification of the shared object dependency comprises evaluating the enclave program to identify a function call operation.

In example 15, regarding the subject matter of example 14, an enclave loader identifies the function call operation.

In example 16, regarding the subject matter of examples 14-15, causation of association between the shared object dependency and the enclave shared object comprises linkage of the shared object dependency to the enclave shared object, and causation of association between the shared object dependency and the enclave-loadable non-enclave shared object comprises linkage of the shared object dependency to the enclave-loadable non-enclave shared object.

In example 17, regarding the subject matter of examples 13-16, identification of the shared object dependency comprises receiving a notification of an exception identifying invocation of a syscall operation, the syscall operation identifying a function, and wherein causation of association between the shared object dependency and the enclave shared object comprises identification of the enclave shared object that provides the function.

In example 18, regarding the subject matter of example 17, an enclave data linker receives the notification of the exception.

In example 19, regarding the subject matter of examples 17-18, causation of association between the shared object dependency and the enclave shared object comprises identification of the enclave shared object that provides the function.

In example 20, regarding the subject matter of examples 13-19, the enclave shared object relates to enclave privileged interaction with a device.

In example 21, regarding the subject matter of example 20, the interaction with the device occurs absent instructions in a non-enclave memory and absent data in a non-enclave memory, and the device is on the same chip as an enclave memory.

In example 22, regarding the subject matter of examples 20-21, the device relates to at least one of a protected audio video path capable device.

In example 23, regarding the subject matter of examples 20-22, the device relates to a communication device and the interaction relates to communication regarding a secure socket layer.

Example 24 is a method comprising: receiving an enclave program for operation in an enclave, identifying at least one shared object dependency of the enclave program, determining whether the shared object dependency corresponds to at least one enclave shared object, causing association between the shared object dependency and the enclave shared object in circumstances where the shared object dependency corresponds to the enclave shared object, and causing association between the shared object dependency and an enclave-loadable non-enclave shared object in circumstances where the shared object dependency fails to correspond to the enclave shared object.

In example 25, regarding the subject matter of example 24, identification of the shared object dependency comprises evaluating the enclave program to identify a function call operation.

In example 26, regarding the subject matter of example 25, an enclave loader identifies the function call operation.

In example 27, regarding the subject matter of examples 25-26, causation of association between the shared object dependency and the enclave shared object comprises linkage of the shared object dependency to the enclave shared object, and causation of association between the shared object dependency and the enclave-loadable non-enclave shared object comprises linkage of the shared object dependency to the enclave-loadable non-enclave shared object.

In example 28, regarding the subject matter of examples 24-27, identification of the shared object dependency comprises receiving a notification of an exception identifying invocation of a syscall operation, the syscall operation identifying a function, and wherein causation of association between the shared object dependency and the enclave shared object comprises identification of the enclave shared object that provides the function.

In example 29, regarding the subject matter of example 28, an enclave data linker receives the notification of the exception.

In example 30, regarding the subject matter of examples 28-29, causation of association between the shared object dependency and the enclave shared object comprises identification of the enclave shared object that provides the function.

In example 31, regarding the subject matter of examples 24-30, the enclave shared object relates to enclave privileged interaction with a device.

In example 32, regarding the subject matter of example 31, the interaction with the device occurs absent instructions in a non-enclave memory and absent data in a non-enclave memory, and wherein the device is on the same chip as an enclave memory.

In example 33, regarding the subject matter of examples 31-32, the device relates to at least one of a protected audio video path capable device.

In example 34, regarding the subject matter of examples 31-33, the device relates to a communication device and the interaction relates to communication regarding a secure socket layer.

Example 35 is an apparatus comprising means for performing the method of examples 24-34.

In example 36, regarding the subject matter of example 35, the means for performing the method comprise a processor and a memory.

In example 37, regarding the subject matter of example 36, the memory comprises machine-readable instructions, that when executed cause the apparatus to perform the method of any of examples 24-34.

Example 38 is at least one computer readable medium comprising instructions that, when executed, implement a method or realize an apparatus as described in any of the preceding examples.

What is claimed is:

1. An apparatus to provide secure operation comprising:
   at least one processor;
   at least one memory, the at least one memory comprising instructions that when executed by the processor, cause the apparatus to perform, at least, the following:
      receive an enclave program for operation in an enclave;
      identify at least one shared object dependency of the enclave program; and
      determine whether the shared object dependency corresponds to an enclave shared object or a non-enclave shared object; and
   an enclave dynamic linker comprising instructions that when executed by the processor, cause the apparatus to perform, at least, the following:
      cause association between the shared object dependency and the enclave shared object in response to a determination that the shared object dependency corresponds to the enclave shared object; and
      cause association between the shared object dependency and an enclave-loadable non-enclave shared object in response to a determination that the shared object dependency corresponds to the non-enclave shared object;
   wherein the enclave-loadable non-enclave shared object is a trampoline shared object;
   wherein, when the shared object dependency corresponds to the non-enclave shared object, the instructions, when executed, cause the apparatus to invoke the trampoline shared object in response to invocation of the shared object dependency;
   wherein invocation of the trampoline shared object comprises replication of data associated with a function call associated with the trampoline shared object from at least one enclave memory to at least one non-enclave memory;
   wherein invocation of the trampoline shared object causes transfer of operation from the enclave to a non-enclave-loadable shared object associated with the trampoline shared object; and
   wherein causation of transfer of operation to the non-enclave-loadable shared object comprises invocation of an enclave proxy, the enclave proxy to send a directive that identifies the non-enclave-loadable shared object to the enclave loader.

2. The apparatus of claim 1, the enclave dynamic linker comprising instructions that when executed by the processor, cause the apparatus to perform causation of invocation of the enclave shared object based, at least in part, on invocation of the shared object dependency.

3. The apparatus of claim 2, wherein invocation of the shared object dependency relates to performance of a function call associated with the enclave shared object.

4. The apparatus of claim 2, wherein invocation of the shared object dependency relates to invocation of a syscall operation indicative of a syscall function associated with the shared object dependency and performance of a function call of the enclave shared object, said function call corresponding to the syscall function.

5. The apparatus of claim 1, wherein causation of transfer of operation to the non-enclave-loadable shared object comprises invocation of a syscall operation by the enclave loader.

6. At least one non-transitory computer readable storage medium to provide secure operation comprising instructions that, when executed, cause an apparatus to:
   receive an enclave program for operation in an enclave;
   identify at least one shared object dependency of the enclave program;
   determine whether the shared object dependency corresponds to an enclave shared object or a non-enclave shared object;
   cause association between the shared object dependency and the enclave shared object in response to a determination that the shared object dependency corresponds to the enclave shared object; and
   cause association between the shared object dependency and an enclave-loadable non-enclave shared object in response to a determination that the shared object dependency corresponds to the non-enclave shared object;
   wherein the enclave-loadable non-enclave shared object is a trampoline shared object;
   wherein, when the shared object dependency corresponds to the non-enclave shared object, the instructions, when executed, cause the apparatus to invoke the trampoline shared object in response to invocation of the shared object dependency;
   wherein invocation of the trampoline shared object comprises replication of data associated with a function call associated with the trampoline shared object from at least one enclave memory to at least one non-enclave memory;
   wherein invocation of the trampoline shared object causes transfer of operation from the enclave to a non-enclave-loadable shared object associated with the trampoline shared object; and
   wherein causation of transfer of operation to the non-enclave-loadable shared object comprises invocation of an enclave proxy, the enclave proxy to send a directive that identifies the non-enclave-loadable shared object to the enclave loader.

7. The medium of claim 6, wherein identification of the shared object dependency comprises evaluating the enclave program to identify a function call operation.

8. The medium of claim 7, wherein an enclave loader identifies the function call operation.

9. The medium of claim 7, wherein causation of association between the shared object dependency and the enclave shared object comprises linkage of the shared object dependency to the enclave shared object, and wherein causation of association between the shared object dependency and the enclave-loadable non-enclave shared object comprises linkage of the shared object dependency to the enclave-loadable non-enclave shared object.

10. The medium of claim 6, wherein identification of the shared object dependency comprises receiving a notification of an exception identifying invocation of a syscall operation, the syscall operation identifying a function, and wherein causation of association between the shared object dependency and the enclave shared object comprises identification of the enclave shared object that provides the function.

11. The medium of claim 10, wherein an enclave data linker receives the notification of the exception.

12. The medium of claim 10, wherein causation of association between the shared object dependency and the enclave shared object comprises identification of the enclave shared object that provides the function.

13. The medium of claim 6, wherein the enclave shared object relates to enclave privileged interaction with a device.

14. The medium of claim 13, wherein the interaction with the device occurs absent instructions in the non-enclave memory and absent data in the non-enclave memory, and wherein the device is on the same chip as the enclave memory.

15. The medium of claim 13, wherein interaction with the device involves a protected audio video path.

16. The medium of claim 13, wherein the device to comprises a communication device and the interaction relates to communication regarding a secure socket layer.

17. A method to provide secure operation, comprising:
receiving an enclave program for operation in an enclave;
identifying at least one shared object dependency of the enclave program;
determining whether the shared object dependency corresponds to an enclave shared object or a non-enclave shared object;
causing association between the shared object dependency and the enclave shared object in response to a determination that the shared object dependency corresponds to the enclave shared object; and
causing association between the shared object dependency and an enclave-loadable non-enclave shared object in response to a determination that the shared object dependency corresponds to the non-enclave shared object;
wherein the enclave-loadable non-enclave shared object is a trampoline shared object;
wherein, when the shared object dependency corresponds to the non-enclave shared object, the method comprises invoking the trampoline shared object in response to invocation of the shared object dependency;
wherein invoking the trampoline shared object comprises replicating data associated with a function call associated with the trampoline shared object from at least one enclave memory to at least one non-enclave memory;
wherein invocation of the trampoline shared object causes transfer of operation from the enclave to a non-enclave-loadable shared object associated with the trampoline shared object; and
wherein causing transfer of operation to the non-enclave-loadable shared object comprises invoking an enclave proxy, the enclave proxy to send a directive that identifies the non-enclave-loadable shared object to the enclave loader.

18. The method of claim 17, further comprising causing invocation of the enclave shared object based, at least in part, on invocation of the shared object dependency.

19. The medium of claim 6, wherein causation of transfer of operation to the non-enclave-loadable shared object comprises invocation of a syscall operation by the enclave loader.

20. The method of claim 17, wherein causing transfer of operation to the non-enclave-loadable shared object comprises invoking a syscall operation by the enclave loader.

* * * * *